(12) United States Patent
Sutherland et al.

(10) Patent No.: US 9,440,356 B2
(45) Date of Patent: Sep. 13, 2016

(54) CUSTOMIZABLE ROBOTIC SYSTEM

(71) Applicant: CROSSWING INC., Markham (CA)

(72) Inventors: Stephen B. Sutherland, Aurora (CA); Dale Wick, Markham (CA)

(73) Assignee: CrossWing Inc., Markham, ON (CA)

( * ) Notice: Subject to any disclaimer, the term of this patent is extended or adjusted under 35 U.S.C. 154(b) by 0 days.

(21) Appl. No.: 14/662,431

(22) Filed: Mar. 19, 2015

(65) Prior Publication Data
US 2015/0190927 A1    Jul. 9, 2015

Related U.S. Application Data

(63) Continuation of application No. 13/806,382, filed on Dec. 21, 2012, now Pat. No. 8,994,776.

(51) Int. Cl.
| | | |
|---|---|---|
| *G05B 15/00* | (2006.01) | |
| *B25J 9/16* | (2006.01) | |
| *H04W 4/00* | (2009.01) | |
| *H04L 29/06* | (2006.01) | |
| *B25J 5/00* | (2006.01) | |
| *B25J 11/00* | (2006.01) | |

(52) U.S. Cl.
CPC ............ *B25J 9/1689* (2013.01); *B25J 5/007* (2013.01); *B25J 11/009* (2013.01); *H04L 65/60* (2013.01); *H04W 4/005* (2013.01); *G05B 2219/40174* (2013.01); *Y10S 901/01* (2013.01)

(58) Field of Classification Search
CPC ...... B25J 9/1689; B25J 11/009; B25J 5/007; H04W 4/005; H04L 65/60; Y10S 901/01
USPC .......... 701/23, 24, 36; 700/259, 245; 901/1; 345/156; 382/153; 318/568.12; 463/40
See application file for complete search history.

(56) References Cited

U.S. PATENT DOCUMENTS

| | | | | |
|---|---|---|---|---|
| 8,670,017 B2* | 3/2014 | Stuart | .................. | G06F 19/321 219/137.2 |
| 2002/0153184 A1* | 10/2002 | Song | ...................... | A47L 9/009 180/167 |
| 2004/0182614 A1* | 9/2004 | Wakui | ...................... | B25J 5/007 180/7.1 |
| 2007/0219654 A1* | 9/2007 | Frink | ...................... | G06Q 30/02 700/91 |
| 2009/0301522 A1* | 12/2009 | Abehasera | ............ | E04H 4/1654 134/18 |

* cited by examiner

*Primary Examiner* — Gertrude Arthur Jeanglaud

(57) ABSTRACT

A telepresence robot uses three separately controlled omniwheels and a computer processing arrangement to reposition the robot based on received positional signals. The telepresence robot captures and transmits visual information of a limited field of view and visual information of a broad field of view. The visual information is received and displayed on a remote input device and portions of the displayed information are selected to send an appropriate signal to reposition the robot based on the selected portion. A method of remotely controlling a telepresence robot is also disclosed.

7 Claims, 19 Drawing Sheets

CUSTOMIZABLE ROBOTIC SYSTEM

This is a continuation of pending U.S. application Ser. No. 13,806,382 filed Dec. 21, 2012 and titled "CUSTOMIZABLE ROBOTIC SYSTEM", and which is incorporated herein by reference.

BACKGROUND OF THE INVENTION

The present invention is in the technical field of robotic applications and in particular is useful in a-mobile platform suitable for various communication systems that include a robotic presence. In a preferred application a virtual presence robotic device is provided that advantageously uses a number of existing computer arrangements to reduce cost and extend the applications and customizations.

A robotic virtual presence provides telepresence functionality that includes enabling an experience of presence at a location which is remote from that of the physical being, and also provides those who are in the presence of the robot, the experience that someone is being projected through the robot.

Telepresence systems ideally require a communication access device through which bi-directional audio and video is carried between the user (or users) and the remote location of the robot along with motion instructions to enable the user to freely explore remote surroundings. The telephone could be considered the first generation of telepresence in that it bi-directionally carries only one of mans' senses, that of hearing, almost instantaneously across virtually any distance spanning two physical beings. This one-to-one form of communication, whereby each participant requires an access device conforming to a global connectivity standard known as the POTS system, remains ubiquitous today.

Telephones are available with a variety of customized features meeting wide ranging communications applications including business, hospital and personal needs. For example, conference calling capabilities were invented which enabled any number of communication access devices, in any number of locations, to tie together to enable multiple parties to concurrently converse. This many-to-many form of communication is commonly used throughout the world today as the cost per minute of communications, and the inclusion of standard telephones as compatible access devices, enables the service to be easily afforded and accessed by the population at large.

The next leap in telepresence occurred when real-time, bi-directional transmission of a second sense of man, that of sight, between two beings was commercially deployed by AT&T over 3 decades ago. Known as the PICTUREPHONE™, the one-to-one service was a commercial failure with low adoption due to high access device costs. Although backward compatible with any POTS access device, without a large number of persons equipped to communicate via PICTUREPHONES, and no method of identifying at the outset of a call who had PICTUREPHONE™ capabilities, and no options to enhance or specifically target the performance of the PICTUREPHONE™ for vertical markets, it was difficult to justify the $1000-plus cost per device.

Cellular and VOIP phones adding mobile telepresence access, when launched, also included features ensuring their compatibility with existing POTS infrastructure. Today, numerous videoconferencing systems employing common display monitors and projectors, speakers, microphones, and cameras spanning inexpensive laptop, game console, and television web-cam linkups through to dedicated multimedia conference rooms exist which primarily leverage now ubiquitous web connectivity channels, but still typically include support for standard POTS access to the voice channel by those without specialized access devices. Many proprietary video extensions also provide services which make it quick and easy to find which contacts have compatible video capabilities and most advanced systems support many-to-many communications via sight and sound.

Despite advancements in telepresence systems, each participant must still pro-actively engage in the establishment of the conference—and activate, typically via a key press or voice command, an access device at the outset of such communication. Even the latest videophone application, Apple's FACETIME™, requires that the launch of the communication channel be established by two people who must both be in physical connection with the access device—in this case, an Apple IPOD™ or IPHONE™.

The end objective of robotic telepresence systems is to create a true remote representation, or presence, of the individual being. But this has yet to be achieved at a cost acceptable to, or with any catalyst for, mass adoption. Each system proposed offers no global inter-connectivity with other systems, other than in some cases via basic POTS. Early robotic-assisted communications systems, dating back over a decade to at least the embodiments disclosed in Canadian Patent No. 2289697 issued to Treviramus et. al., teach of robotic mechanisms for moving both the monitor and camera to face sources of sound. Other systems, such as that disclosed in U.S. Pat. No. 7,171,286 issued to Wang, et. al., teach of more elaborate controls and motion mechanisms enabling the control of any linked robot from any other robot to facilitate both auditory and visual communications as well as a means to prioritize access requests. Another teaching, in U.S. Pat. No. 6,292,713 issued to Jouppi, et. al., provides a comprehensive framework for a telepresence device complete with an array of cameras and speakers, yet the application ignores any system enabling ubiquity, and related cost considerations.

As a distinct science from that of telepresence, early virtual presence concepts could be thought to have been first explored during the development of a program known as ELIZA™, written at the Massachusetts Institute of Technology between 1964 and 1966 by J. Weizenbaum which simulated the questions and responses of a hypothetical psychotherapist through a teletype interface. The author of the present invention also wrote a similar program with much larger vocabulary in 1974 at Upper Canada College which, also accessed via a teletype, consumed a very significant portion of a HEWLETT-PACKARD™ minicomputer's memory during operation. Observers in both cases found the illusion that a real person was responding to their comments and questions entered at the teletype very compelling despite the lack of auditory or visual clues. The algorithms developed at Upper Canada College were also able to use rudimentary rules to classify and store input, providing the additional illusion that the 'person' at the remote end of the teletype was learning from day to day as the vocabulary expanded.

There remains a need for a true telepresence robot which can project the individual into a remote location without the need for each end of a communication session to be activated by a participant. There further remains a need for a customizable telepresence platform supporting a wide breadth of usage scenarios while ensuring interoperability with low entry point access devices to succeed in the marketplace. Lastly, there remains the need for a true virtual presence robot which appears to be operated remotely by a human, yet is actually a simulation of such telepresence projected through visual, auditory, and autonomous motion clues.

SUMMARY OF THE INVENTION

A method of controlling a telepresence robot according to the present invention comprises connecting the telepresence robot to the internet, using the telepresence robot to produce a first signal containing visual information with respect to a narrow field of view of a preferred facing direction of the telepresence robot, using the telepresence robot to produce a second signal containing visual information with respect to a broad field of view that includes both ground information in front of the telepresence robot and environmental information in at least a forward direction of the telepresence robot and information with respect to the narrow field of view, using the telepresence robot to transmit over the internet the first and second signals, receiving the first and second signals at a receiving device and displaying the first and second signals, selecting a portion of the displayed second signal on the input device and sending to the telepresence robot information identifying the selected portion, and receiving at the telepresence robot the information identifying the selected portion and using the information to adjust the telepresence robot such that the facing direction of the telepresence robot is based on the selected portion.

According to an aspect of the invention, the method of the telepresence robot uses the information to selectively activate motors used to drive omni-wheels of the telepresence robot to reposition the telepresence robot as required.

In a preferred aspect of the method, the broad field of view is a panoramic view.

A telepresence robot according to the invention comprises a base with at least three omni-wheels with each omni-wheel having a separately controlled motor drive. A computer processing arrangement receives positional signals used to selectively activate each motor drive to reposition the telepresence robot in accordance with the positional signals. A first camera provides a digital signal of visual information in a limited field of view of the telepresence robot, and a second camera provides a digital signal of visual information of a broad field of view of the telepresence robot that includes visual information of the limited field of view. A communication arrangement transmits signals of the limited field of view and the broad field of view. A receiving arrangement is provided for receiving positional signals used to control the motor drives for repositioning of the telepresence robot. Preferably, the telepresence robot includes ultrasonic sensors and an ultrasonic sensor controller provides additional information used to control the position of the telepresence robot using the motor controllers.

In a preferred embodiment, the hardware components are re-mountable sub-assemblies or modules including any one of: (a) an interchangeable head attachment apparatus supporting and augmenting numerous mass-market consumer electronics display/microphones/cameras/tablet/smartphone devices which enables the telepresence system to be easily updated with more powerful processing and sensing capabilities and new algorithms as new consumer devices and platforms are released and upgraded, (b) an omni-wheeled base with motors, batteries and sensors, capable of moving safely, and virtually silently in any direction and providing embedded processing, electrical power, wireless, USB, and I2C bus connectivity to other sub-assemblies and components therein, and (c) a mid-section module typically incorporating an embedded laser pointer and a 360 degree 2D or 3D camera apparatus, plus numerous application-specific options. A transition module interconnecting the base and the mid-section module can also be provided.

Software components preferably include: (a) embedded controller code running in the base which interpret and execute standardized motion and control commands for both the omni-wheeled base and application-specific motors, (b) standardized diagnostic and robotic systems health reporting code, and optional peripheral code also a part of the embedded controller code running in the base, (c) core application code running on the head device responding to both remote communications from the user and local navigation priorities and robotic systems health reporting demands, (d) where supported by libraries within the head device, application code transmitting spoken commands to the remote services and receiving and processing service replies, (e) third party application code, preferably available through existing online application stores for ubiquitous consumer electronics devices, communicating via a standardized set of API's to interact with core application code to effect motion control, (f) remote application code enabling the user, on any supported device, to experience virtual presence via the robotic apparatus.

Service components preferably include: (a) a Hub function where users find, and initiate links with the virtual presence robots, (b) respond to service requests from the virtual presence robotic apparatus, and (c) monitor robotic systems health.

To assist certain applications, remote displays, transmitters and receivers communicate with the robotic apparatus to extend coverage and provide further audio and visual information of a user's actual location and to provide improved communication with the user or augment robotic navigation.

DETAILED DESCRIPTION OF THE INVENTION

Figure 1:
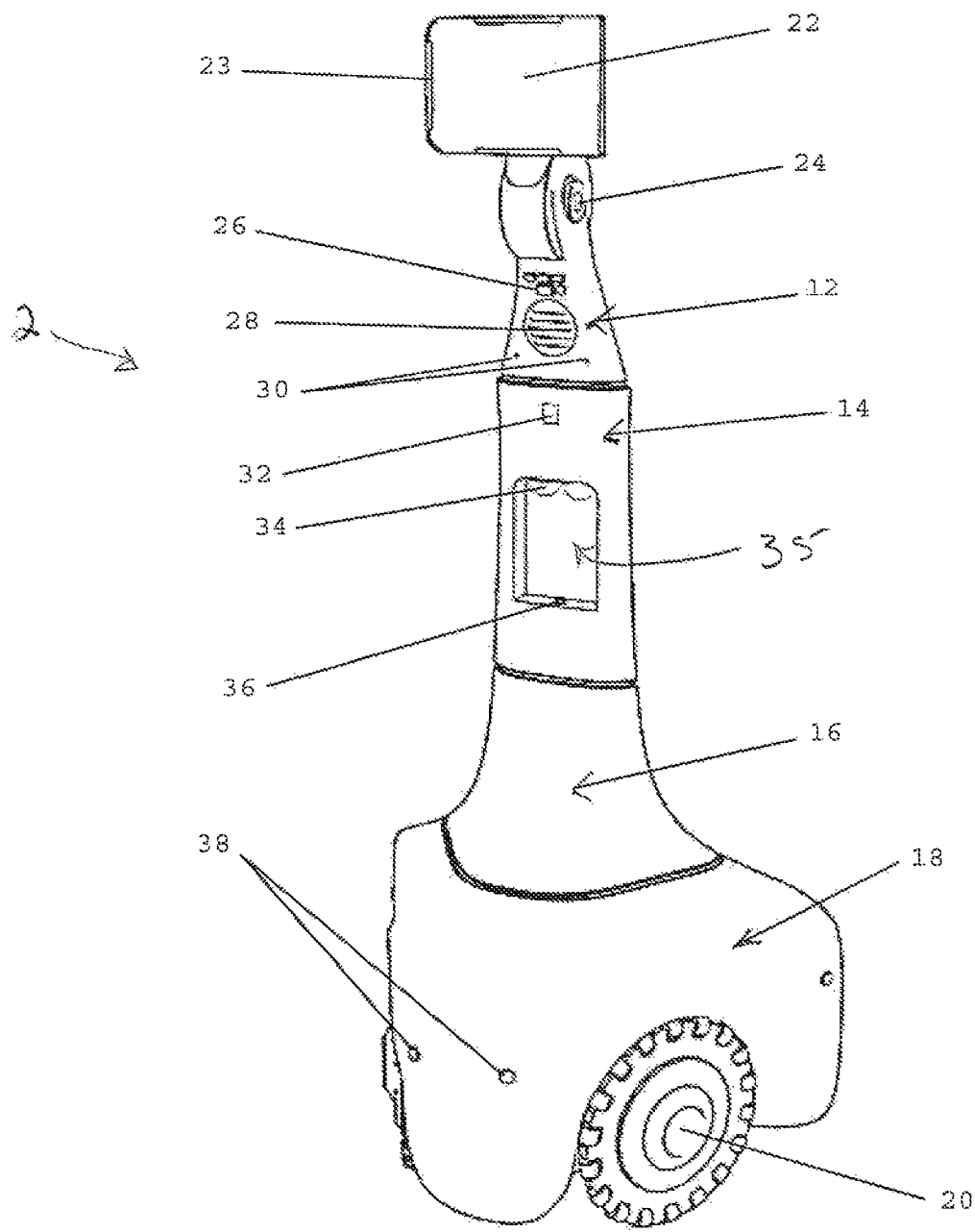
FIG. 1 is a perspective view of the virtual presence robot according to an embodiment of the present invention.
Figure 2:
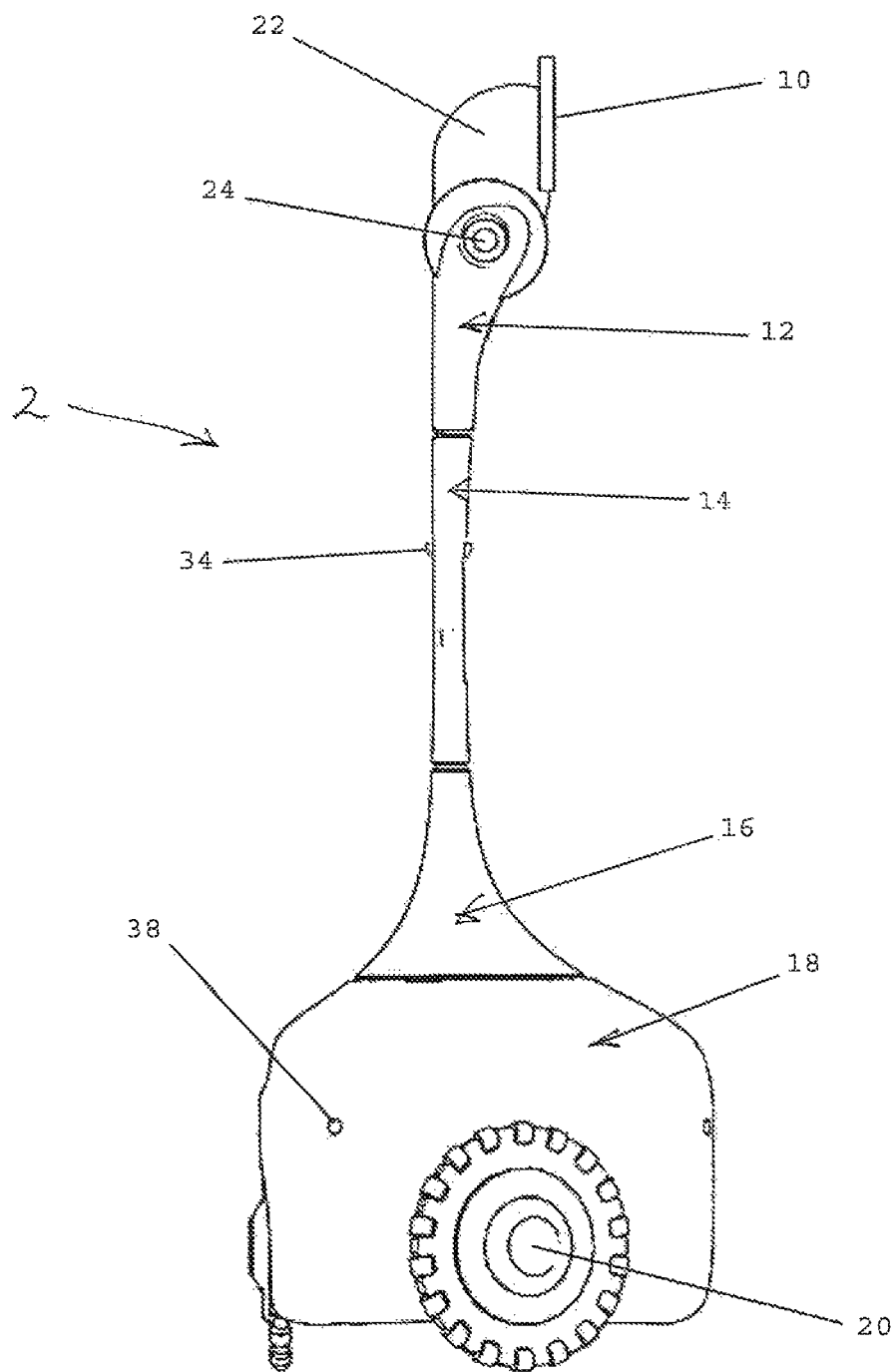
FIG. 2 is a side view of the virtual presence robot according to an embodiment of the present invention.
Figure 3:
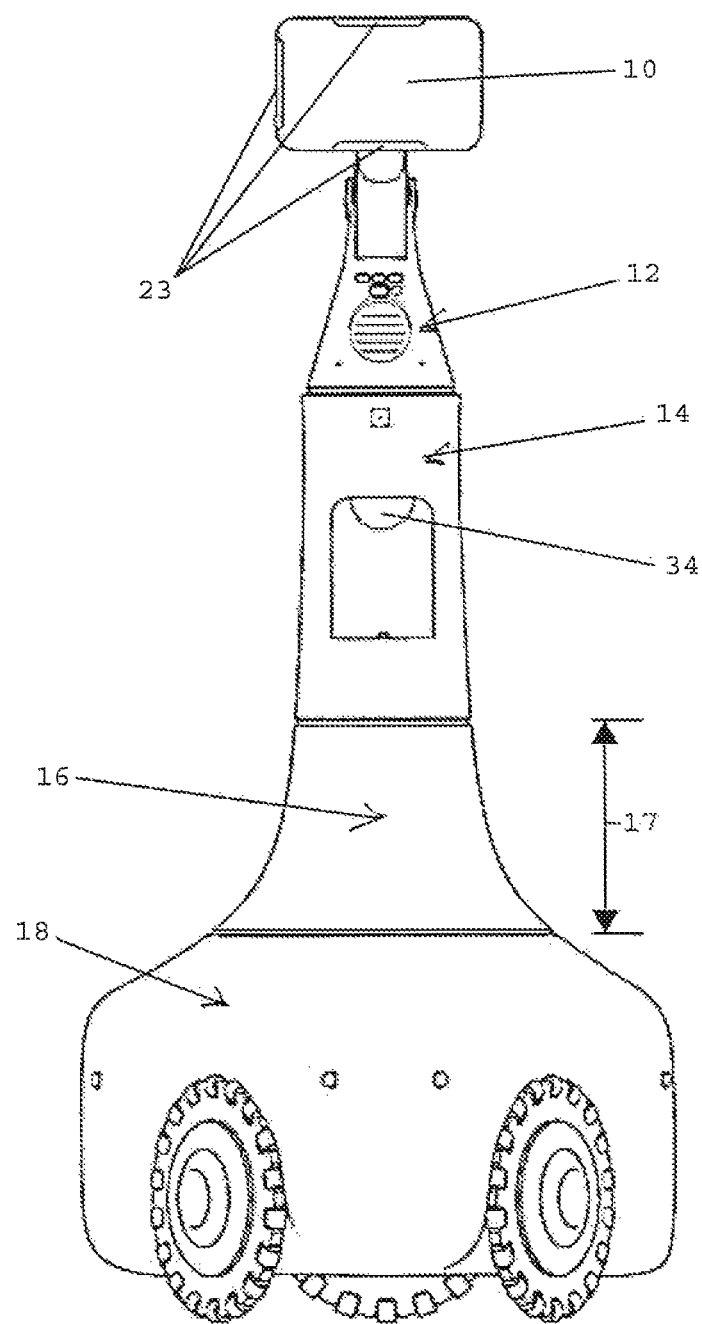
FIG. 3 is a front view of the virtual presence robot according to an embodiment of the present invention.

Referring now to the invention in more detail, in FIGS. 1 to 3, there is shown an embodiment of the virtual presence robot 2 having four distinct sub-assemblies or modules: the head sub-assembly 12, mid-section sub-assembly 14, transition sub-assembly 16 and base sub-assembly 18, which can be quickly and easily assembled with minimal fastening points by an unskilled purchaser. The modular design of the virtual presence robot provides flexibility and allows it to be shipped in a cost effective manner. Sub-assemblies of the illustrated embodiment are designed to be inexpensively made of injection-molded plastics, and use their exoskeletons as the primary structural members. Each sub-assembly is also designed to be offered in different functional forms, to meet varying customer expectations while maintaining compatibility and interoperability as will be presented in more detail below. The sub-assemblies may be disassembled as necessary for upgrade or replacement of any sub-assembly using common connection techniques, making the reconfiguration thereof including remounting and reassembly simple and fast.

The modular design provides advantages for shipping, however more importantly it allows for multiple models and convenient updating or customization for particular applications.

Figure 8:
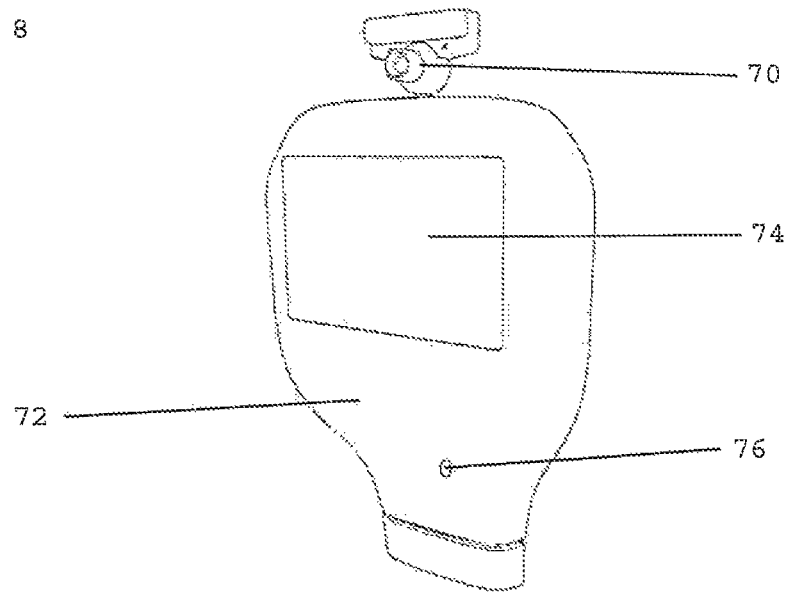
FIG. 8 is an alternate head for the virtual presence robot according to an embodiment of the present invention.

Turning specifically to FIG. 1, the head sub-assembly 12 includes one of a number of possible tilting mounting plates 22 with guide tabs 23 designed to securely hold a customer-selected third party mass produced tablet or smartphone. The robot is preferably designed to function with such a third party device being properly docked into the mounting plate or otherwise electrically connected via USB. WiFi or cellular connectivity with remote services and users, and preferably most of the processing power necessary to operate the robot, is preferably delivered through the third party head device. A special head sub-assembly that does not require a third party device is shown in FIG. 8.

The driven tilt mechanism 24 enables the third party head device to face down, straight ahead, or up at varying angles to exhibit emotion, change the field of view of the camera (assuming the given third party device includes a camera) and in conjunction with the wheels 20 to provide left/right motion, establishing eye contact between the remote user who is facing out of the screen of the third party head device and the person or persons in proximity to the virtual presence robot.

The ability to provide eye contact is an effective communication function. In order to enable the head device to convey the remote operator's eye contact in the virtual session, two cameras are ideally deployed at the remote location to capture, and re-center both the head and eye position of the operator. This is done through 3D reconstruction of the operator's head and in particular face, in real time. Facial expressions are preserved, as is some eye movement. In this way, if there are, for example, three people sitting on a couch in front of a television connected to the virtual presence robot, algorithms capturing the scene of the group facing the television will identify the speaker and then take their head and fill the frame of the head device with this reconstruction, even if the person speaking isn't squarely in front of the camera.

This ensures that those in the room with the virtual presence robot feel a stronger connection with the individual speaking. This connection may be further enhanced, should the head device support the display of 3D video. Facial reconstruction can also be achieved with one RGB-D camera or even a simple RGB camera and prior knowledge of the participant's facial geometry.

The tilt mechanism 24 also compensates for periods when the base 18 is not level as determined by a gyro in the base—for example, when climbing a wheelchair ramp or in unlikely emergencies if the robot begins to fall over where, in such cases, the tilt mechanism receives commands in an attempt to prevent the third party device from impacting the floor. In some cases, a more complex tilt mechanism may be deployed to enable the head to pivot from side to side or extend outwards to project over a bed or wheelchair.

Also shown in FIG. 1 is a large speaker 28 and noise-cancelling microphones 30 which are present if the third party device doesn't have suitable speaker and microphone capabilities for the intended use. For example, many third party tablets have suitable speakers and microphones for home environments and thus could use a lower-cost head sub-assembly without the need for the large speaker. However, for virtual presence office or shopping, the larger speaker and higher quality microphones may be preferred such that some third party head devices may have two or more different head sub-assemblies for users to choose from, depending upon the breadth of target applications and available budget.

An array of microphones provides the robot with the ability to sense the direction of sound as well as perform noise-cancelling. Sensing the direction of sound provides extremely valuable sensory data in numerous scenarios:

a. security monitoring—enables the robot to sense the direction of intrusions or other security events (falling trees, water leakage, window breakage, etc.) to further investigate—algorithms can use the microphone array to move towards the sound;
  b. navigation—when combined with the 360 degree camera, enables the robot to gracefully move out of the path of people or other robots moving towards it and also, in the case of guide robotic uses, enables the robot to guide people (blind and/or hearing impaired) out of the way of such moving vehicles; and
  c. health care—enables the robot to hear verbal calls for assistance and, as desired, move towards such sources of sound for further investigation; and
  d. Note that for cost reasons, only one microphone may be used in some head assemblies where the direction of incoming sound is not critical.

As will be further discussed, additional microphones and/or speakers may be provided that are placed within the robot's environment—for example in a fixed location (perhaps an in-accessible location) to provide additional sensory data or broaden functionality.

The head sub-assembly 12 also includes status lights and a 'do not disturb' button 26 which when pressed or actuated remotely (from any authorized wireless connection), illuminates and prevents external telepresence connections with the robot. Assuming the third party head device is attached (either physically or wirelessly), it also updates the robot's status at the service hub (described in more detail later). Other lights indicate battery charge level and charging state (irrespective of whether the third party head device is connected), when the head device is properly seated in the mounting plate 22, or when the head device is connected to the robot wirelessly via Bluetooth or WiFi, amongst other features.

New head sub-assemblies, and updated applications (where software updates are necessary, such as those typically delivered through third party application stores) are brought to market to correspond with launch events for new third party models of smartphones and tablets. Generally, such new consumer electronics devices incorporate increasing processing speed and memory, better camera and display technologies, and enhanced wireless communications capabilities. By enabling the virtual presence robot to support these new hardware advancements via a simple upgrade to the head sub-assembly, product life is significantly increased as the array and quality of capabilities of the robot can improve over time as existing applications run faster and new applications become feasible. As previously noted, in some cases, a given third party device may give rise to two or three different head sub-assemblies ranging in cost based on functionality—the most basic of which would not include the tilt mechanism 24, speaker 28, and microphones 30. Elaborate head sub-assemblies could also include camera arrays (augmenting or replacing the 360 degree imaging apparatus currently located in the mid-section 14) where a high vantage point is needed or to free the mid-section 14, typically housing the 360 degree imaging apparatus for other uses.

The mid-section 14 is also designed to be available in a variety of configurations. The most basic and inexpensive mid-section has no functionality and thus, with this configuration, navigation of the virtual presence robot must only rely on features of the configured head device and the ultrasonic sensors 38 in the base sub-assembly 18. However, this embodiment can successfully employ existing mass market consumer electronics devices, such as the Microsoft KINECT, which if joined with a tablet or other device in the head sub-assembly, is capable of providing all necessary sensory data and processing for successful navigation. (For even more inexpensive configurations, Microsoft's KINECT may also be used on its own, as described later and illustrated in FIGS. 15 and 16).

To best support navigation and collision-avoidance with typical current third party smartphones and tablet driven heads, mid-sections with at least a forward down facing camera, or more ideally 360 degree vision encircling the area about the base, is desired. Where more precision or smoother execution is desired, especially in environments such as hospitals where collisions are absolutely unacceptable yet corridors congested with other moving traffic are common, or where the motion of multiple robots must be orchestrated in addition to the possibility of including remote sensors, a special mid-section could also be customized to house additional sensors beyond the 360 degree vision sensor, including infrared (consisting of infrared sensor and one or more infrared lighting devices), ultrasonic (consisting of separate or combined emitter and receivers) and laser range finders. In these cases, multiple sensory data streams would be fetched by the head device which would perform the processing, optionally while communicating with other robots, or the head device could offload some or all of the processing tasks to higher speed remote processing servers which would then send near real time direction and speed updates back to the robot. It is further advantageous, especially in long run time environments, to off-load more complex vision and navigation to remote servers which are directly connected to the power grid, thereby reducing battery drain and being able to leverage the latest CPU and GPU designs. Note that via an API, internal processing of the ultrasonic sensor data in the, base sib-assembly would be set to only interrupt motion in extremely close proximity collisions.

For special vertical market uses, such as hospital or nursing home drug delivery for example, the mid-section module 14 can also be adapted as a medical prescription pill dispensing arrangement with tracking capability coupled with corresponding software running in the head device which would enable access to drugs, and monitoring of their ingestion, at prescribed times each day. The mid-section can also contain a tray and optional cup-locking mechanism which can be used to deliver drinks to patients or test samples to a lab (see FIGS. 13 and 14).

In conjunction with a remote robotic loading station, the virtual presence robot can make multiple trips between a loading station and patients thereby freeing support staff for other more demanding functions. At each patient location, by assessing web resources and under control of a remote service, the robot can, for example, present a realistic rendering of a human face making informative, yet soothing, small-talk of current events like the weather forecast or news highlights, reading online poems or books, playing music, or commenting on what was going to be fun to watch on TV while waking the patient for a drink and then monitoring the patients ingestion of medications. Such patients could additionally have passive identification devices to assist in recognition and delivery. Such vertical applications and related mid-section sub-assembly designs could be supplied by third-parties which would seamlessly integrate into the robot, given that the API for the base will support common motor and solenoid control. These third-parties might also develop map libraries and possibly fit the environment with special ceiling, wall or floor markers to aid in autonomous navigation as directed by their remote service.

There are a number of ways of achieving the desired 360 degree vision including multiple camera arrays and fish-eye lenses, any of which might be incorporated into various mid-section or head sub-assembly versions offered for different configurations, at different price-points, of the virtual presence robot. The mid-section 14 embodiment in FIG. 1 illustrates an inexpensive and effective apparatus generating both a 360 degree field of view (or essentially 360 degree field of view) and 3D video using at least two reflective domes 34 facing a video camera 36. According to this embodiment, the 360 degree imaging apparatus has an inexpensive video camera with lens 36 pointing upwards, through the open port 35 in the mid-section, to capture the reflections from the downward facing reflective domes 34. Using prior knowledge of both the lens and dome designs, as well as the distance between them, the distortions of the reflections captured by the camera 36 are then pre-processed by the embedded microprocessor of the main circuit card 64 (see FIG. 5) in the base 18 to produce a series of images or video stream, including optional distance information in the case of two or more domes, which can be effectively used by the autonomous navigation system. These images or the video stream may optionally be further processed, including the creation of 3D video if two or more domes are used, before display to assist a remote operator with semi-automatic navigation. To keep production costs low in the illustrated embodiment, the domes are manufactured using injection-molded plastic coated with a reflective surface. The domes are illustrated as half-spheres, but other shapes which provide different distortion patterns, some of which enable a more even density of pixels from the camera across the field of the image, can be used.

Any number of domes may be used to create a 360 degree video, although a single dome 34 as illustrated in FIG. 3 cannot produce a 3D scene. In the case of single or twin dome 34 installations, portions of the 360 degree field of vision will be obstructed by one or more vertical supports and in the case of twin domes, a true 3D scene cannot be generated along the single plane vertically cutting both domes. Given that typical motion of the robot is forward or backwards at varying angles but not often directly sideways, in the embodiment illustrated in FIGS. 1, 2 & 3, the mid-section 14 has a simple, thin profile, yet structurally sound design which permits two obstructed fields at both 90 and 270 degrees from the forward position. As illustrated in FIG. 2, the mid-section 14 is generally planar and the domes 34 can be made to extend past the side width of the mid-section. As will be appreciated by those skilled in the art, the port between the domes and camera in mid-section 14 seen clearly in FIGS. 1 and 3, could be redesigned to remove one of the two supporting sides and by relocating and replacing the other with a much thinner profile to relocate and reduce the size of the obstructed area. However, such redesign would require significantly stronger materials to prevent vibrations from randomly perturbing the relationship between the camera lens and the dome, which is ideally fixed to ensure consistent post-processing of the scene. A further modification to the design could see the entire camera-dome apparatus on a swinging and possibly pivoting horizontal axle such that when the robot is moving up or down wheelchair ramps, the horizon would remain level. In the case where a higher view in any direction was desired, the motion of an axle swings the apparatus forward or backward tilting the mirrored domes away from the intended point of interest, thereby increasing the field in that direction.

Where 3 or more domes are installed, a full 360 degree field can be constructed without any obstructed portions, but assuming a constant camera 36 pixel count, with each addition of a dome 34, the effective resolution of the resulting 360 degree field is significantly reduced, since the camera's field of view must be broadened to encompass all domes which avail lower pixel coverage for any given dome. An alternate method of providing an unobstructed 360 degree field as the robot moves in any direction except exactly in the direction of the obstruction is to interpolate the obstructed pixel data from prior frames in conjunction with data arriving from other sensors including the ultrasonic sensors in the base sub-assembly. Such interpolated data could not effectively represent moving objects such as animals without significant processing power which may be available in future head device upgrades or could be provided by remote servers processing the data arriving from the robot before re-transmission to the remote user.

The mid-section sub-assembly 14 also includes a laser pointer apparatus 32 which in some applications can also function as a laser pattern emitter for 3D object reconstruction. As mentioned earlier, an infrared lighting apparatus may also be included in the mid-section sub-assembly with the appropriate infrared-sensitive camera 36 so that the virtual presence robot can navigate in relative darkness without disturbing those sleeping or watching television or playing video games in reduced light conditions.

A number of transition sub-assemblies 16 can be used to satisfy different height requirements as illustrated in FIG. 3 by the arrows 17. The standard transition sub-assembly 16 adds enough height to the virtual presence robot that the head is at a height comfortable for conversations with people sitting in a living-room or around a kitchen table or lying in bed, yet is not uncomfortable when addressing people standing. It has no electronic or motorized functions, but such may be included as desired for specialized applications. For example, in some applications, this sub-assembly might also contain compartments to hold cups or other objects augmenting certain mid-section functionality, particularly for nursing home and hospital applications, and these compartments can include contact or other sensors or latching mechanisms. The transition sub-assembly may also be provided with an automated extension capability for specialized applications requiring both comfortable seating height and standing height head options.

The modularity of the virtual presence robot or mobile platform allows adaption thereof for use by those confined to wheelchairs or beds. By augmenting both the length of the transition sub-assembly and the head sub-assembly to enable articulation by adding two degrees of freedom, the head sub-assembly can then enable the head device to extend either over a bed, facing downwards, or across, just above the lap of a person sitting in a wheelchair or sitting upright in a bed. Additional vision sensors that enable image processing algorithms executed in the head device to appropriately extend across a wheelchair or over a bed without collision, are relatively inexpensive component add-ons, as the 'infrastructure' to support these and the additional motors exists within the virtual presence robot. The present system makes it possible to thus bring the face of the remote user to confined elderly and disabled friends and relatives without the need for construction of a completely custom device. All other features, including remote services, are also available to the confined individual. It is instructional to note that in much the same way as the head device is extended to a more comfortable location for wheelchair and bed access, it could also be extended across a table for meal service orders—although useful in retirement and nursing homes, it also has application in commercial restaurants.

The head sub-assembly can also be customized to both extend in height and to tilt backwards in a counter-balanced fashion such that such head device is facing upwards at times. In this configuration for example, a Doctor can use the virtual presence robot's head device to take notes with accurate time and location stamps, or review files while not having to carry a table from room to room in a hospital. This frees the Doctor's hands to perform procedures and, with appropriate navigation (and ideally, pre-programmed information about the location of each patient), speech recognition, and gesture recognition algorithms running in the head device, the virtual presence robot can move from room to room following the Doctor and automatically display various files and take notes (both written, aural, and visual) without the Doctor actually coming into physical contact with the virtual presence robot—thereby reducing the chance of physical contamination. The modular nature of the virtual presence robot enables this type of customization without the need to design an entirely custom system or new mobile platform. When one vertical market, such as the Hospital scenario defined above, justifies the development of a new module like the backwards tilting head sub-assembly, application developers from other vertical markets can leverage ubiquitous web application stores to offer and quickly deploy new specialized applications, targeted in their area of expertise. In this way, the backwards tilting head sub-assembly might find applications in vertical markets such as laboratory and clinical deployment, industrial monitoring and reporting, and security sweeps.

Going back to the hospital example above, the height of the head sub-assembly can also be customized so that it can closely interface with hospital equipment—for example, to periodically, and autonomously, capture a photograph of each IV bag in a hospital ward for automated vision processing, ensuring an extra check of fluid level and/or timing of replacement.

FIGS. 11 through 14 illustrate two different mid-section modules designed for particular applications in addition to the telepresence functionality.

Figure 11:
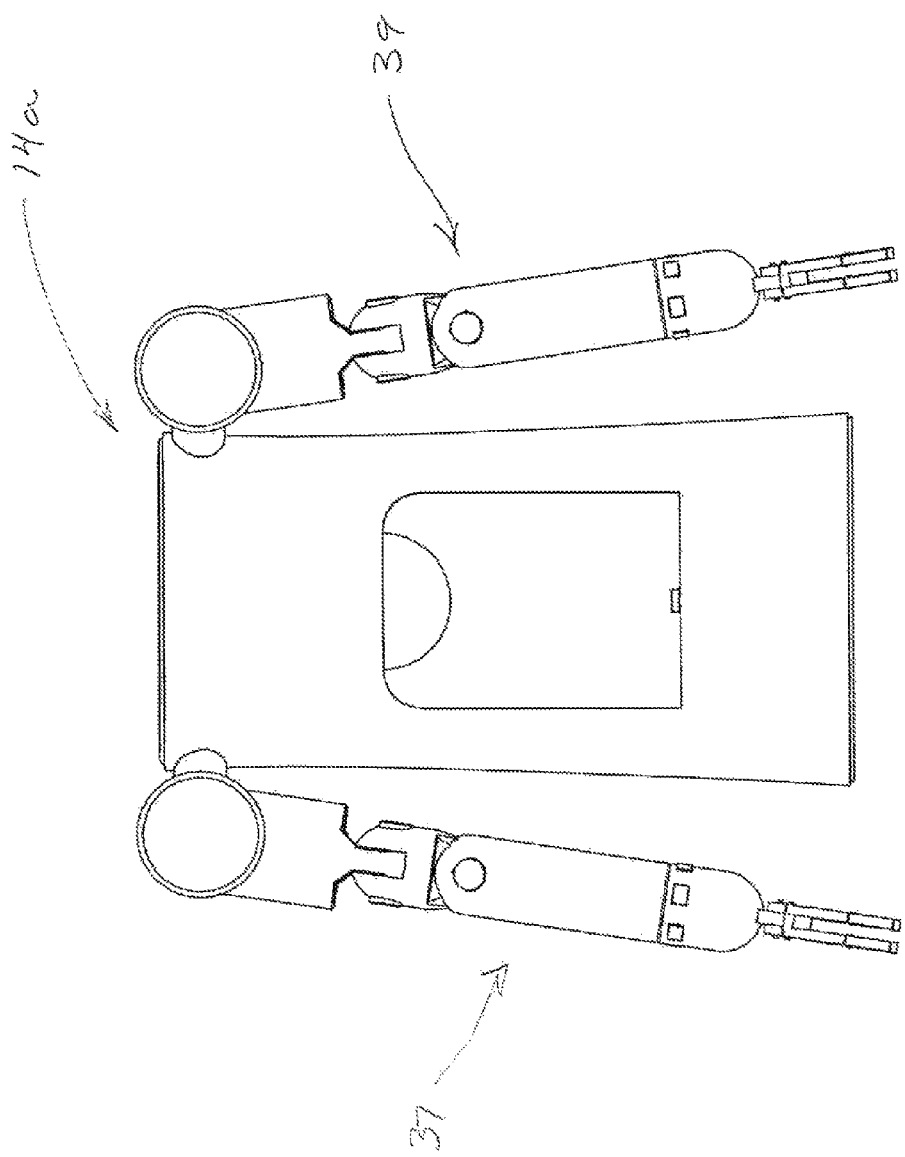
FIG. 11 is a front view of an alternate mid-section module with movable arms.
Figure 12:
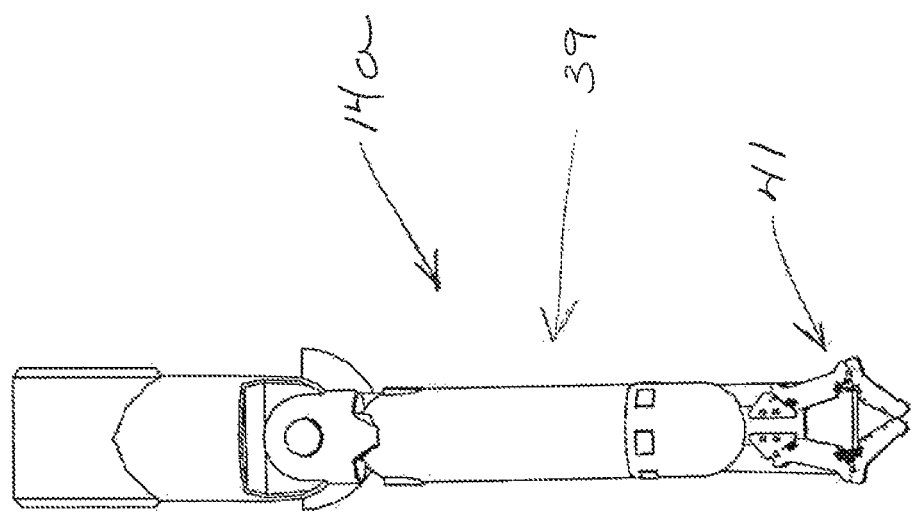
FIG. 12 is a side view of the alternate mid-section module.

For example, a mid-section sub-assembly can be provided for opening doors in institutions or homes. Different door levers would require different relatively low-cost mid-sections or universal manipulator arms and grippers as shown in FIGS. 11 and 12 can be deployed. Since many hospitals have standardized, easily opened door handles, a single-purpose actuator requiring only one additional motor is all that would typically be required. As budgets permit, deploying a mid-section sub-assembly with universal manipulator arms broadens the number of tasks possible. Irrespective of the approach selected for the mid-section, special purpose components such as these may be augmented, where fire or other heavy doors are opened, with higher torque motors in the base sub-assembly having sufficient short-term torque abilities for these intermittent applications. The omni-wheeled base enables the virtual presence robot to move with the precise curvature of the door. By adding appropriate autonomous navigation algorithms, the virtual presence robot can be called via a patient call button to any room in a hospital.

Looking more closely at FIGS. 11 and 12, the modified mid-section module 14a includes opposed robotic arms 37 and 39. These driven arms include pivoting joints (generally corresponding to shoulder, elbow and wrist pivoting) and a gripping function (grippers 41) to perform various functions for manipulations of objects about the robot by a remote operator or, in the example noted above, to open doors or perform other autonomous actions.

Figure 13:
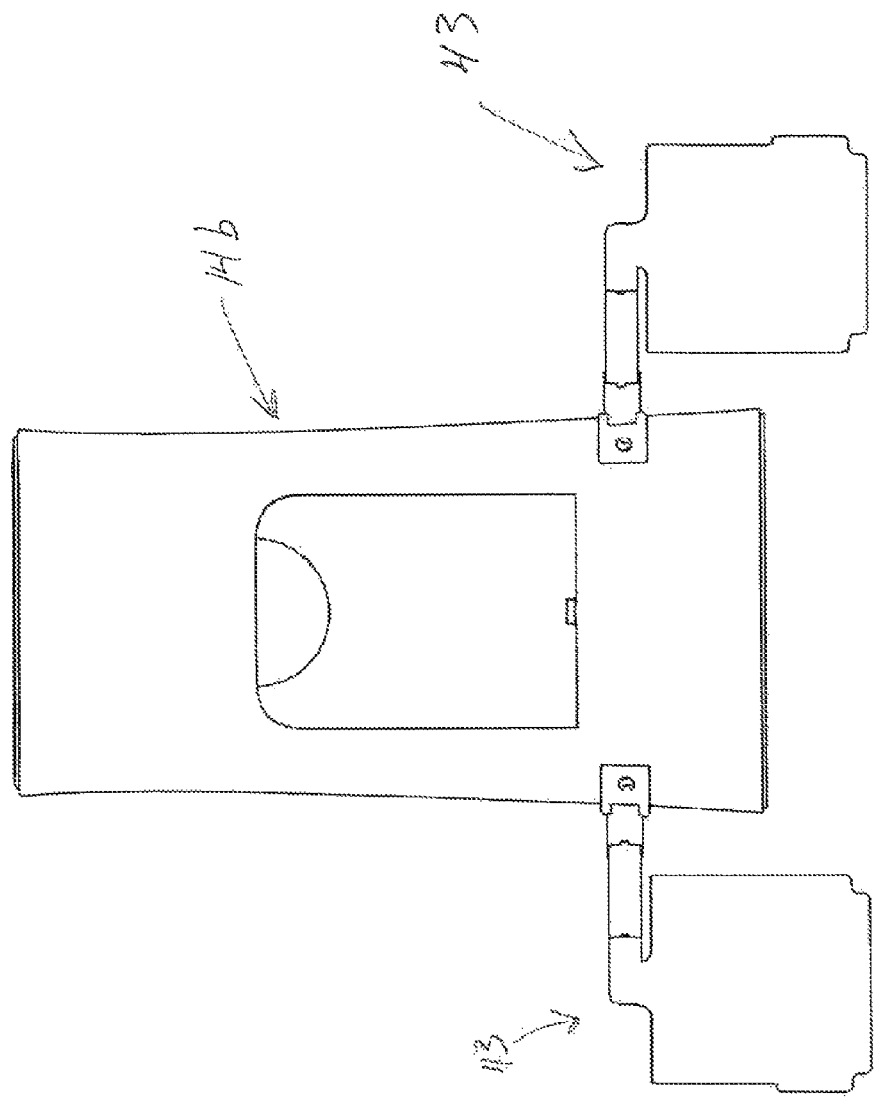
FIG. 13 is a front view of a further alternate mid-section module with two cup holder appendages.
Figure 14:
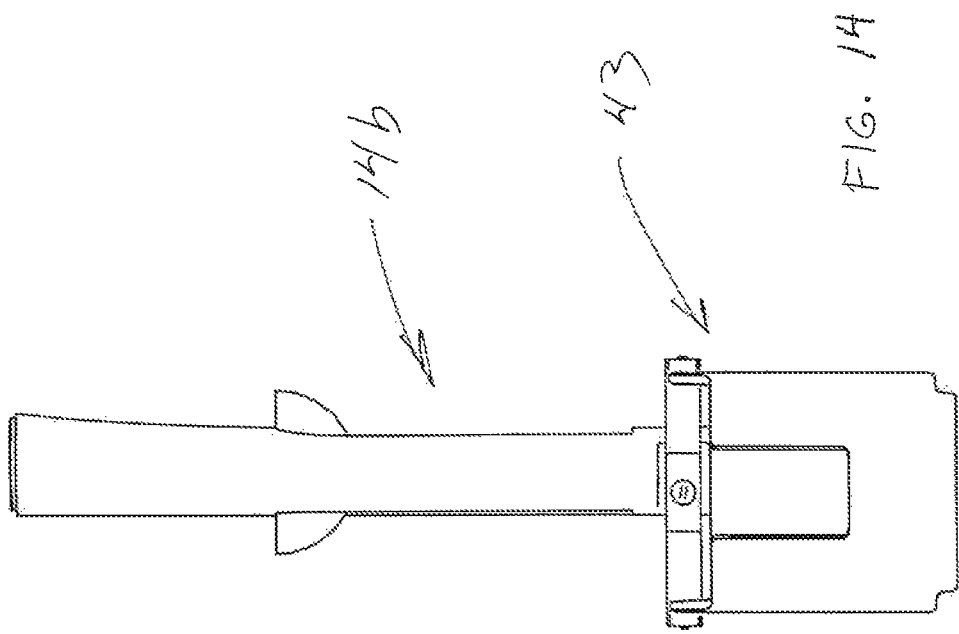
FIG. 14 is a side view of the further alternate mid-section module.

The modified mid-section 14b of FIGS. 13 and 14 includes selectively closable cup or beverage holders 43 to assist in delivery of food and/or beverages to individuals in restricted environments such as hospital or long term care facilities. This mid-section design can also be used for restricted access conditions.

Referring back to FIG. 1, the base sub-assembly 18 is illustrated as an omni-wheeled device capable of moving in any direction. The base sub-assembly includes three omni-wheels 20 mounted at 60 degrees to each other forming a triangle. Those experienced in the art will understand that there are many types of omni-wheels, including some with double wheels on each axle or other designs including omni-ball wheels which, for the purposes of the present invention, although some achieve a quieter, less vibration prone movement across hard surfaces, all achieve the desired ability under programmed motion control to effect varying speeds in varying directions.

Between each pair of omni-wheels 20 is located at least one, and in the preferred embodiment two, ultrasonic sensors 38. The ultrasonic sensors provide feedback necessary for the embedded motion controller to avoid obstacles. These are preferable to touch-sensitive bumpers due to the possible inertial consequences of a sudden stop, typified of those robots which rely on a physical bump or touch before decelerating. Since the base 18 is designed to operate effectively with a variety of payloads (a variety of transitional, mid-section, and head subsections, plus the mass produced tablet or other head) carrying out a multitude of different applications, the motion control capability of the base is finely tunable to avoid sudden stops or lurches. If transporting liquids, those skilled in the art will appreciate that any increase or decrease in speed or change in direction conforms to wave-cancelling motion profiles.

Referring FIG. 4, a perspective view of an embodiment of the base sub-assembly 18 with the transitional section removed illustrates an internal baffle 40 which can be injection molded in one piece and which prevents customers from entering the machine compartment below when they are initially assembling the robot or have disassembled the transitional sub-assembly from the base sub-assembly to upgrade components. The baffle has two twelve volt battery compartments 44 in which batteries 42 are inserted. These customer-installed batteries may be easily replaced or upgraded. In the illustrated embodiment, the batteries take the form of common, mass produced, rechargeable tool batteries which are typically available in economical Nickel-Cadmium and more power-dense, Lithium-Ion types. Through the side of the base sub-assembly is a port 54 where the battery connector plate 52 is secured. Note that this port 54 is normally covered with a simple assembly holding the ultrasonic sensors, and is not customer removable. Note also that the two batteries 42 are either side of the rear wheel, when the virtual presence robot is facing forward so that in the unexpected event of a sudden forward stop, the weight of the batteries helps to counter-balance the inertia of the head. When moving backwards, the rear wheel's perpendicular axis makes the likelihood of a rear fall, even with a more sudden stop, very low.

The base sub-assembly 18 can also include a separate dock station that allows for recharging of the batteries when the virtual presence robot is docked therewith.

The virtual presence robot preferably communicates with remote transmitters and receivers that may be provided as a further source of information. This is helpful for multi-level applications or where certain areas are not available to the robot. Remote displays and speakers can also be present. For example, WiFi connection to a further laptop computer or tablet can be used as a remote input and output station.

The diversity of hardware configurations and upgrade options enabling a corresponding evolution and growth of applications for the virtual presence robot targeted at ensuring a long product lifespan is also reflected in the system's online components. Each of the virtual presence robots has a corresponding online profile at a hub which not only controls remote access and linkage with affiliated display devices, but also links each robot with a series of services, many of which are only available with a periodic subscription fee.

Directory services enable web visitors to the hub, to find publicly available virtual presence robots through a booking engine for group virtual experiences like guided virtual field trips and tours whereby a number of web users collectively and simultaneously experience a virtual presence through one virtual presence.

Other bookings through the directory enable web users to reserve a virtual presence robot for their exclusive use for a period of time. Using NASA as an example, in this case web users would check the directory for museums and select NASA. NASA, like other large tourist exhibits, would offer a number of virtual presence robots for use during the day when the facilities are open on a restricted basis, according to how busy the facility is at a given time of day (since these would be 'mingling' with other real visitors to the complex) and in the evening after normal visiting hours have ended, might reserve a few hours each night for the exclusive use of virtual presence tourists. Peak times during the day, for example, might be reserved only for teachers who are connecting with their classes for virtual field trips. Booking times would be enforced by the virtual presence robot automatically returning to a central point at the end of any booked time slot so that the next user in line could have timely access.

The directory would also feature shopping venues. For example, there are a great many painting, furniture, and antique galleries who find it extremely time consuming to list each product for sale and provide numerous views. In the shopping directory, web visitors can see a list of immediately available shopping experiences where virtual presence robots are currently available or could schedule a visit to a selected gallery based on virtual presence robot availability. The configuration of the virtual presence robot will vary by store, but typically these would be configured with BLUETOOTH™ communications so that a salesclerk can be called and can even answer via an earbud when more product information is desired without the user of a virtual presence robot actually crying out across the store.

The directory would also feature forums for hotels, restaurants, casinos and other public places where virtual presence experiences are offered. In every case, the virtual presence robot can be limited by the host to move in only selected areas and can also be limited such that it cannot point its camera in certain directions. This would also enable, for example, tours of portions of NASA typically off-limits to the general public. The virtual presence robots enable a massively expanded arena for personal exploration without the threat of vandalism or acts of terror. The base sub-assembly can also be upgraded with larger tires and motors for outdoor and rugged terrain and the transition sub-assembly can be upgraded for automatic stabilization.

Hospitals could also offer a set of virtual presence robots where friends and families of patients could book a virtual presence visit. Versions of the virtual presence robots in this scenario would include autonomous navigation capability, so that the robot would be at the bedside in advance of communications and might also require acknowledgement from the patient before accepting the communication link.

Private, login access only portions of the directory or virtual presence hub would enable pre-authorised users to see the real-time status of the private virtual presence robot (including availability, battery level, and tablet or other head device connection status that is physical or wirelessly connected to the robot) and initiate connections. For example, to monitor a remote property during absence, a user can login to their virtual presence robot on site and tour their property. These robots can be packed away, out of sight when physically on the property, so the annoyance and invasion of personal privacy felt with fixed security cameras is not an issue with virtual presence robots. When logged into any virtual presence robot, commands can be sent by the user to program the virtual presence robot to initiate a connection back to the user at certain times, or if certain events occur. An example might be a loud noise, sudden drop or rise in temperature, or unexpected motion events (curtains moving, etc.).

Real estate agents could also offer regulated logins to prospective buyers. In the case of unoccupied homes or condominiums, 24 hour access to virtual presence robots on each floor or in different areas of the facility could be offered. In the case of occupied private dwellings, limited 'virtual open house' hours could be offered. Questions during a virtual tour can be set to be directed to the cell phone or other device of the agent's choosing. The outdoor capable version of the virtual presence robot would be necessary for recreation property viewing.

Going back to the private login directory, friends and family members can get different levels of login to the virtual presence robot. One level requires acknowledgement from someone in the presence of the virtual presence robot before communications can be established. This prevents unexpected visits. Another level might permit login and the establishment of only audio communications without acknowledgement. The highest level access permits login without acknowledgement and would be particularly vital for people who have ill or mobility impaired friends and family who wish to have periodic check-ins. Through the central directory and hub, linkages from all social media websites can be established, so the availability of a virtual presence robot at a friend or contact's current location would be known, no matter which social media platform was being used. Virtual presence robots may also be assigned a standard POTS telephone number so that they may be 'called' from universal telephones and, depending on the caller-ID of the initiator of the call, appropriate login access will be granted.

Extension of the virtual presence robot's processing and information resources through online services enables further customization of the platform. For example, an application running on the third party head device could, in conjunction with an online service, monitor and learn the daily pattern of an elderly family member. When events occurred outside of the pattern, say breakfast had not occurred by 11 am, the automated portion of the service might telephone the elderly person and if no answer was received, a programmed set of events would then occur— likely beginning with a call to a pre-designated family member who could indicate via touch-tone or spoken commands, whether the event should be ignored or further escalated.

In any location where a virtual presence robot is located, and given that it has the appropriate autonomous navigation and voice recognition applications installed, it can be hailed through smartphones or other WiFi devices or simply called by a large shout, if so programmed. Once in the immediate vicinity of a person, it can be verbally interacted with to establish a communication channel with a friend or associate's virtual presence robot or to perform information gathering (ie: What is the weather forecast? What movies are playing on TV tonight? When is the next AMERICAN IDOL™ on TV?) and provide services (ie: "Please turn on the TV and tune to AMERICAN IDOL™ when it's next on." "Order some SWISS CHALET™ Chicken—two half chicken dinners with fries and a bottle of water." "Read me today's top news stories." "Read me the latest William Shatner book beginning where I last left off." "Call my brother."). If the third party head device does not have enough processing power to perform the voice recognition and formulate the web queries or successfully navigate from room to room, the virtual presence robot can stream the captured audio and video to web services to perform the operation seamlessly from the user's perspective. This enables the virtual presence robot to potentially leverage massive remote computing power to truly simulate dialog with another person and even receive a detailed simulated 'face' on the display with lips moving in synchronization with the audio arriving from the service. Web services from a broad variety of suppliers can be integrated—for example, online ebookstores for reading material, and common VOIP phone services offering VOIP connections to POTS lines and video calling could offer applications which would seamlessly integrate their large user-bases into the virtual presence robot.

With the appropriate mid-section or head sub-assembly, games could also be played by projecting a game board onto a table. True virtual presence is achieved when the communications with such remote services are as fluid as communicating with another human being. Users do not have to go to a special room in the house or sit in front of a computer or hold their smartphones, they can simply call out for the virtual presence robot to come to them and then link with Cloud computing services or to reach out to friends.

Figure 4:
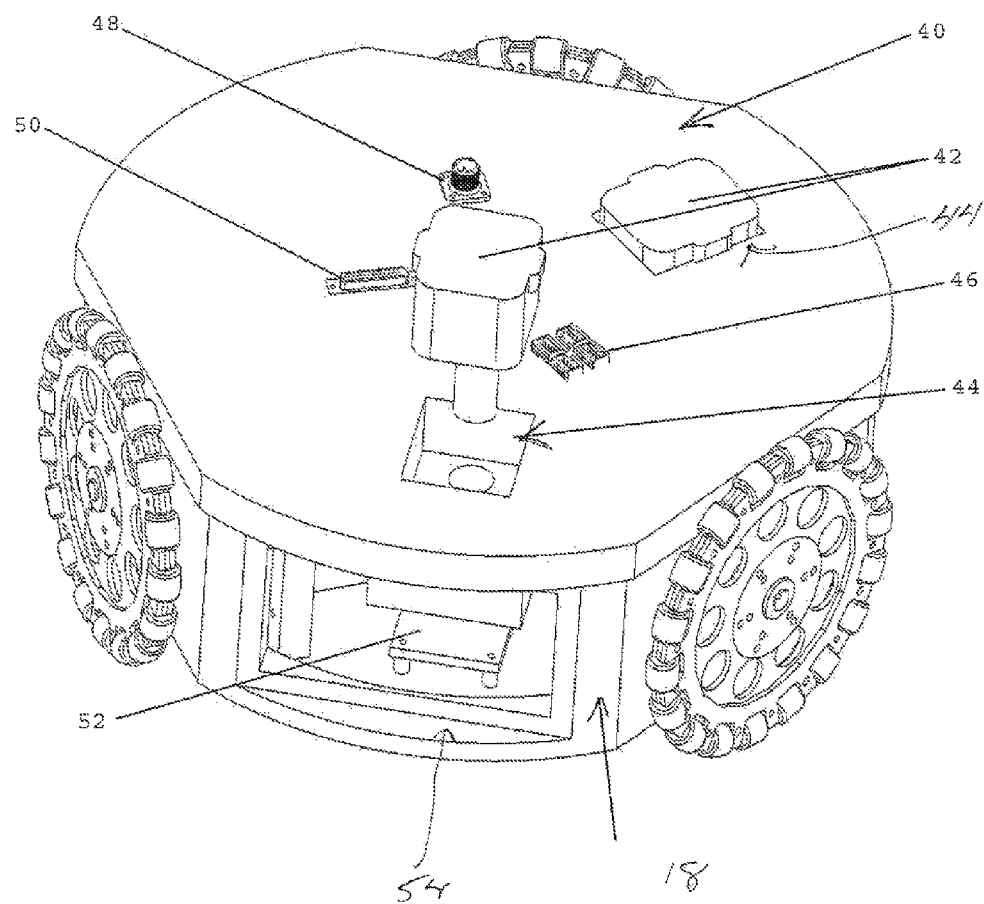
FIG. 4 is an external perspective view of the motor base according to an embodiment of the virtual presence robot of the present invention.
Figure 5:
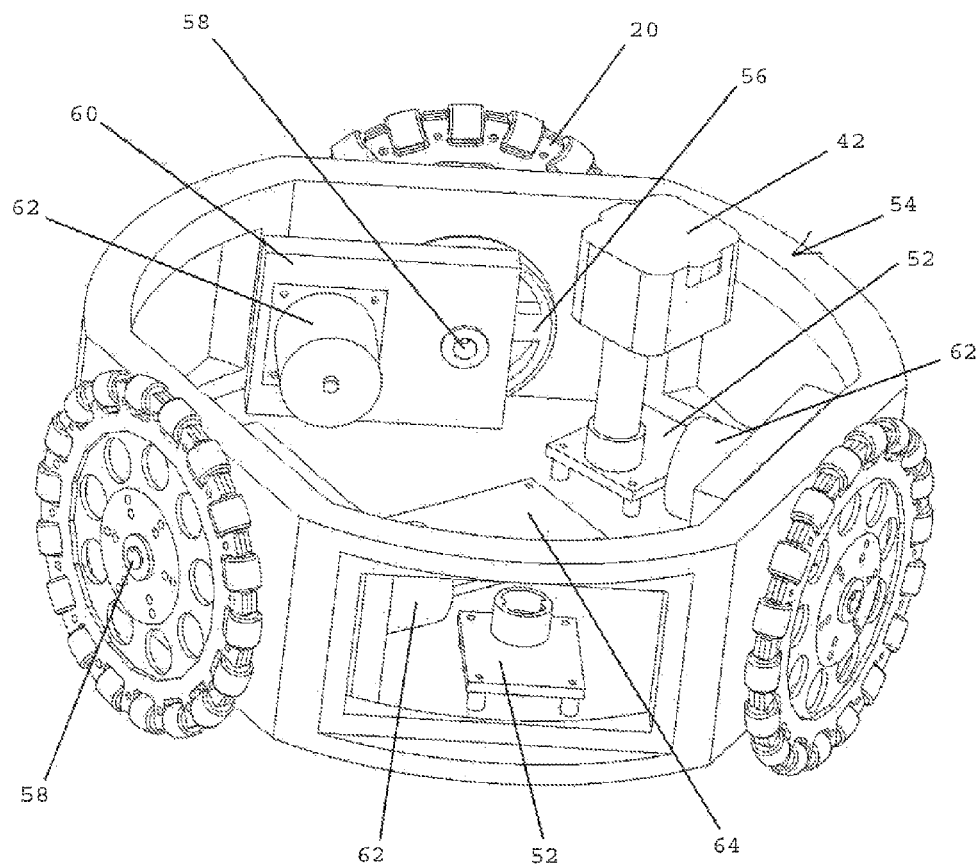
FIG. 5 is an internal perspective view of the motor base according to an embodiment of the virtual presence robot of the present invention.
Figure 6:
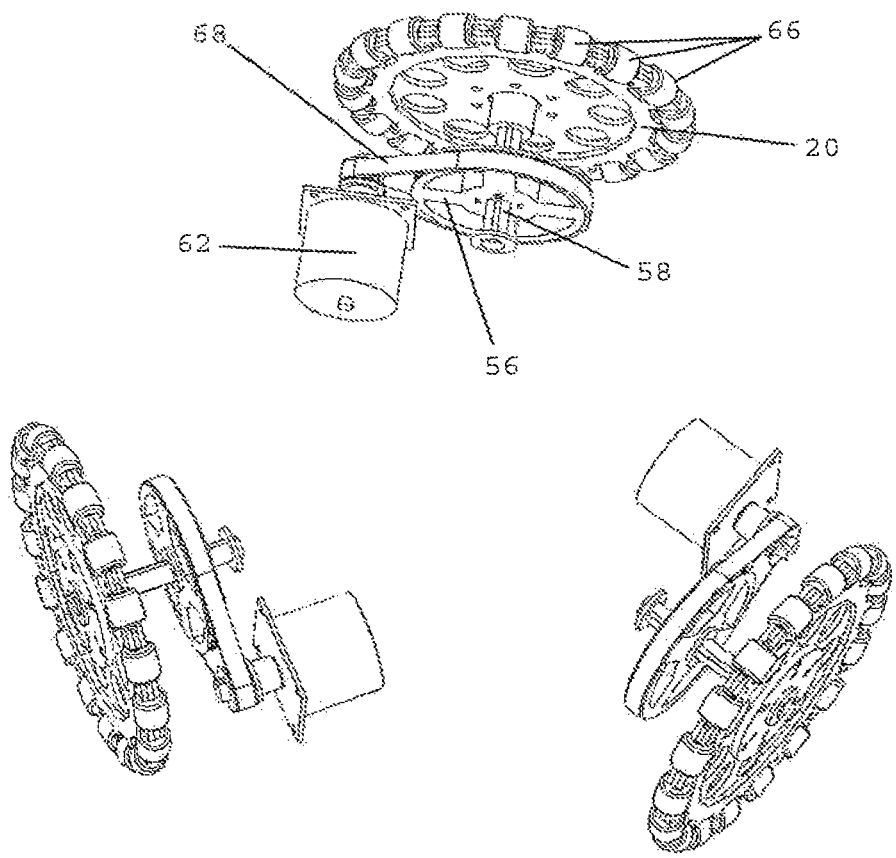
FIG. 6 is an exploded view of the motor configuration within the base according to an embodiment of the virtual presence robot of the present invention.

Additional details of the base module 18 are shown in FIGS. 4, 5 and 6. The internal baffle 40 as shown is removable as illustrated in FIG. 5 to expose four USB ports 46, one DC power connector port 48 and one multi-pin interface connector port 50. Dedicated wires from the USB ports 46 with standard connectors on each end can be easily run within the upper modules of the virtual presence robot during customer assembly to USB components such as the camera capturing the 360 degree fields in selected mid-sections, the speaker/microphone array and possible RGBD devices like the Microsoft KINECT in selected head assemblies (see FIGS. 15 and 16 and the modified head module 12a) and to enable charging and optional communication with the tablet at the docking port. The DC power connector port 48 provides power for devices either controlled through the I2C bus or those connected via USB but exceeding the standard USB power specification—for example, certain speaker setups or projector-enabled mid-sections or a Microsoft KINECT which requires approximately 15 watts of power necessitating a USB connection coupled with an additional power input to correctly feed the modified USB connector on the Microsoft KINECT. The DC power connector also provides power for motors including the head tilt mechanism or pill dispenser, and may be daisy chained from motor to motor, for example, the mechanism with three degrees of freedom (employing three motors) to extend head support beyond the base sub-assembly to bring the head device within easy reach of users sitting in wheelchairs and resting in beds. Lastly, the multi-pin interface connector port 50 provides an I2C bus, control power, and both analog and digital inputs and outputs which are also designed to support parallel data capture devices.

The I2C bus and control power provided by the multi-pin interface connector port 50 may be run throughout the virtual presence robot as necessary to daisy-chain low bandwidth peripherals such as the status lights and button array, laser pointer, control for the head tilt, and controls/sensors for a multitude of possible options including the previously detailed drug dispenser, cup holder, head extension mechanism, and various automated latch mechanisms. Small, power-efficient microprocessors with embedded flash memory including analog to digital converters and I2C bus support may be hung off the bus at any point and at nominal cost to operate numerous mechanisms as required for various vertical markets and/or different applications.

The housing 54 as shown in FIG. 5 is preferably injection molded with minimal post machining and is one continuous piece with the motor mounting plate 60. Small ventilation holes behind each wheel opposite the motor mounting plate enable air to flow into the base without exposing electrical hazards and air is expelled through a mesh at the bottom rear of the unit with the help of a small DC fan.

For illustration purposes, one battery 42 remains in its battery connector plate 52 while the other is missing. Wires running from each battery connector plate 52 to the main circuit card containing the embedded microcontroller 64 carry current from the batteries to the main circuit card during system operation. During charging, current is reversed. As will be familiar to those experienced in the art, in a similar embodiment it is possible to eliminate these sets of wires by enlarging and repositioning the main circuit card so that it spans the area under each battery mounting position, enabling the battery connectors to be located directly on the main circuit card and eliminating the separate battery connector plates. Furthermore, such expanded card could also reach past the left or right battery position to mate with an induction or contact-based linkage with an external docking station for electrical supply during charging. A variety of docking options exist which are commonly known to those skilled in the trade.

Looking again at the base sub-assembly housing 54 in FIG. 5, the preferred embodiment employs brushless DC motors 62 mounted to the motor mounting plate 60 such that the notched pulley on the motor shaft extends through the mounting plate 60 in line with the notched drive pulley 56 locked to the wheel axle 58. Depending upon the available height of the base housing 54 which impacts the aesthetics of the virtual presence robot and must contain the notched drive pulley 56, the torque from the motor may be increased approximately 4-5 times through the ratio of the size of the notched motor pulley and the larger notched drive pulley 56 on the wheel axle. In cases where a higher gear ratio is necessary, such as with the use of a smaller motor or to traverse rugged terrain, worm gear or planetary gear reductions are also possible within the same physical lower base housing.

Although DC gear motors are used in other robots to directly drive wheels at a lower cost and without the controller complexity and need for pulleys and belts, the advantage of the gearless, brushless DC motors connected via belt reduction systems in the preferred embodiment of the present invention are multi-fold: (a) this belt reduction system is much quieter than gear reducers, more closely duplicating relatively silent human motion, (b) the motors spin at much lower speeds, significantly increasing longevity, (c) the motors do not use brushes which, necessary for traditional DC motors, wear out with use—particularly high speed use where a high gear reduction is used to achieve desired torque from a smaller motor, (d) the drive-train is not subject to damage if it is back-driven through an external force whereas many of the inexpensive high ratio gear reducers fail if back-driven and by resisting such forces, make it difficult to manually push or relocate the robot in the event of control or electrical failure, (e) brushless DC motors are typically sensor driven, meaning that they contain hall-effect or other position sensors which when coupled with advanced motion controllers, report on the rotation of the motor—and their motor leads (typically for smaller brushless motors) package such sensor cables in a bundle with coil cables, negating the need for a separately installed shaft sensor and two sets of connectors per motor, and (f) using advanced, current-sensing motor controller design, it is possible to detect unexpected motor load changes and virtually instantaneously shut down the motor.

The preferred embodiment of the present invention facilitates quick installation of the motion components illustrated in FIG. 6, within the base sub-assembly housing 54 illustrated in FIG. 5. A notched high-strength polymer shaft 58 with a cap at one end is inserted into a notched center of omni-wheel 20 and then through a planar polymer flange bearing which is pressed through a hole in the sub-assembly housing 54 then through a polymer washer and through a notched center of the toothed pulley 56 and belt as shown in FIG. 6) and through a second polymer washer then through a hole in the motor mounting plate. At the far end of the shaft, a second polymer flange planar bearing is pressed into the hole in the motor mounting plate and the end of the shaft 58 projecting through the flange is locked in place by a split-ring. The motor 62 with toothed pulley is pushed through an over-sized hole in the motor mounting plate and through the belt 68. The motor is then moved in a direction away from pulley 56, to remove slack from belt 68 and then secured with four screws to the motor mounting plate. A small about of backlash, due to remaining slack in belt 68 is not critical to the overall motion and trajectory of the virtual presence robot since traction variations and general properties of a 3 wheeled omni-wheel setup do not guarantee precise motion. Furthermore, because the width of toothed pulley 56 and the motor pulley are only slightly thinner than the space between the exterior base housing 54 and the motor mounting plate 60, should the belt jump or slip, there is no possibility of it jumping entirely off the pulleys. The motor mounting plate 60 also shields ingress to the electronics from any projections into the vent holes behind the wheels opposite the motor mounting plates and also shields any floppy wires from becoming entangled in the belts.

The main circuit card 64 containing the embedded microcontroller, in addition to the wires running to the battery connectors, wires run from this card to each motor (typically hall effect sensor lines and coil lines unless each motor has an embedded controller, and then in this case, power, and I2C bus lines to each motor), to the ultrasonic sensors surrounding the base, to a small ventilation fan facing downward through a grill at the back bottom of the robot, and to the baffle connecting to each of the USB ports 46, the power connector 48, and the multi-pin interface connector 50.

The main circuit card 64 has a number of embedded systems necessary to support the third party head device and various head, mid-section, transition, and base sub-assemblies via either USB or I2C bus interfaces or wireless communications (typically BLUETOOTH™ or WiFi). Data from these devices and sensors which is not wirelessly passed to the head device, along with motor control and diagnostic information, is processed through the main circuit card and presented as API's accessible through either the USB or wireless link between the embedded system and the head device. Although the head device is typically connected to the USB for charging purposes while docked, all data will be passed via wireless protocol as this enables the head device (typically a tablet computer) to continue to communicate with the virtual presence robot, even while removed from its head sub-assembly. In some cases, where wireless range is too limiting or deemed to be unsecure and a continual connection with the virtual presence robot is vital, the embedded system can also implement Cellular or proprietary protocols to ensure that the head device is connected as broadly as possible. For example, if medical or security monitoring devices are linked with a special transition sub-assembly containing logging and alert processing, the transmission of such alerts to the head device, which in turn makes connections via the Internet only after further analysis of the nature of the alert, is likely to be seen as a critical communications link and would ideally follow two or more possible wireless routes in the event of an emergency alert.

Except in the case where each motor has its own embedded controller, one of the key processors on the main circuit card is a FPGA which simultaneously monitors the hall-effect sensors in each brushless motor 62 and varies the pulses to each of three coil phases in each of the motors to precisely, and simultaneously, control the speed of each motor to effect the desired overall motion of the virtual presence robot. If each motor has its own embedded controller, then similar speed control signals are passed to individual motor controllers daisy chained via I2C. Trajectory adjustments to accommodate varying wheel slippage and transition between floor surfaces and over surface inconsistencies and to accommodate navigation demands are made from vision, ultrasonic and other available off-board sensors (depending upon which mid-section and head functionality is available), as well as an on-board gyro and accelerometer, and are made 20 times a second. Smooth, life-like motion is possible with this combination of sensors. In unexpected emergency situations, for example, if a dog were to jump up on and begin to topple the virtual presence robot, the motors can accept momentary high-current pulses outside their normal operating range for extremely quick motion recoveries—in this example, to move the base as quickly as possible in the direction of the possible head topple.

The main circuit card 64 also includes a DSP (or other image processor) which is typically used to reconstruct the 360 degree scene (in either 2D or 3D) from the camera video of the reflections in the dome (or domes). In conjunction with ultrasonic sensor data from the base, the DSP also calculates potential collisions and other hazards (such as the top of a flight of stairs, for example) based on ideal trajectory information from the third party head device. Irrespective of motion commands from this head device which may also be performing more advanced 3D processing for navigation should it access the 360 degree camera stream via API, the embedded system in the base will not let the virtual presence robot collide with objects or fall off steps and ledges.

Certain devices connected via USB may directly communicate to the head device, assuming the head device is connected in the head sub-assembly with USB for both power and data, without any intervention from processing in the base. This facilitates the inclusion of proprietary third party devices controlled by third party software executing on standard head devices to be added to the robot, where the head device receives USB data, without specific need for software updates to the embedded systems running on the main circuit card. By enabling third parties to attach such devices and thus provide augmented sub-assemblies without the need for embedded system updates, small vertical markets may be cost-effectively addressed by such third parties who can leverage manufacturing volumes of standard sub-assemblies and the overall robot platform.

Where the head device does not receive data via USE (i.e. it is connected to USB in the head sub-assembly for power only), or is removed from the head sub-assembly yet still requires a communications channel, or the USE device is accessed through a generic API provided by embedded code, processing in the base sub-assembly provides documented API access via a wireless connection such as BLU- ETOOTH™ or WiFi. Note that in all cases, devices connected via I2C will have documented API access over either USB or a wireless connection to the head device, depending upon the configuration of the head device. Standardized commands for motor control (ie: for use as a cup lock mechanism), laser pointers, solenoids, status lights, and other I2C devices will also enable third party devices to integrate in the virtual presence robot and be controlled by the head device or remote web services without the need for custom code running on embedded systems in the base.

Figure 7:
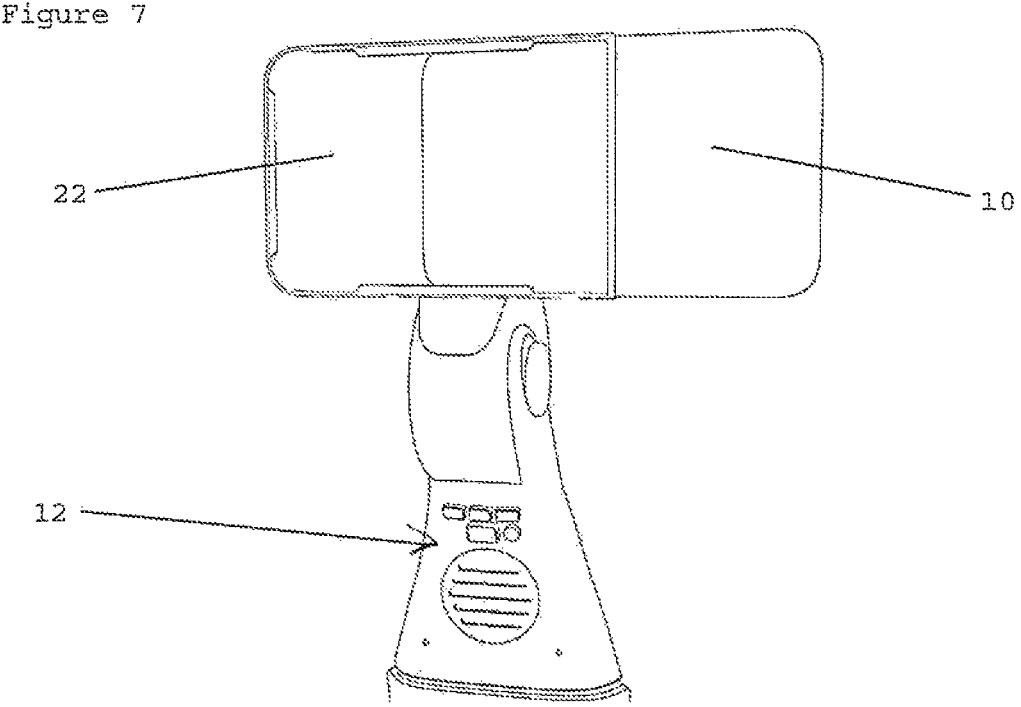
FIG. 7 illustrates the insertion of a commercially available tablet computer into the head support according to an embodiment of the virtual presence robot of the present invention.
Figure 15:
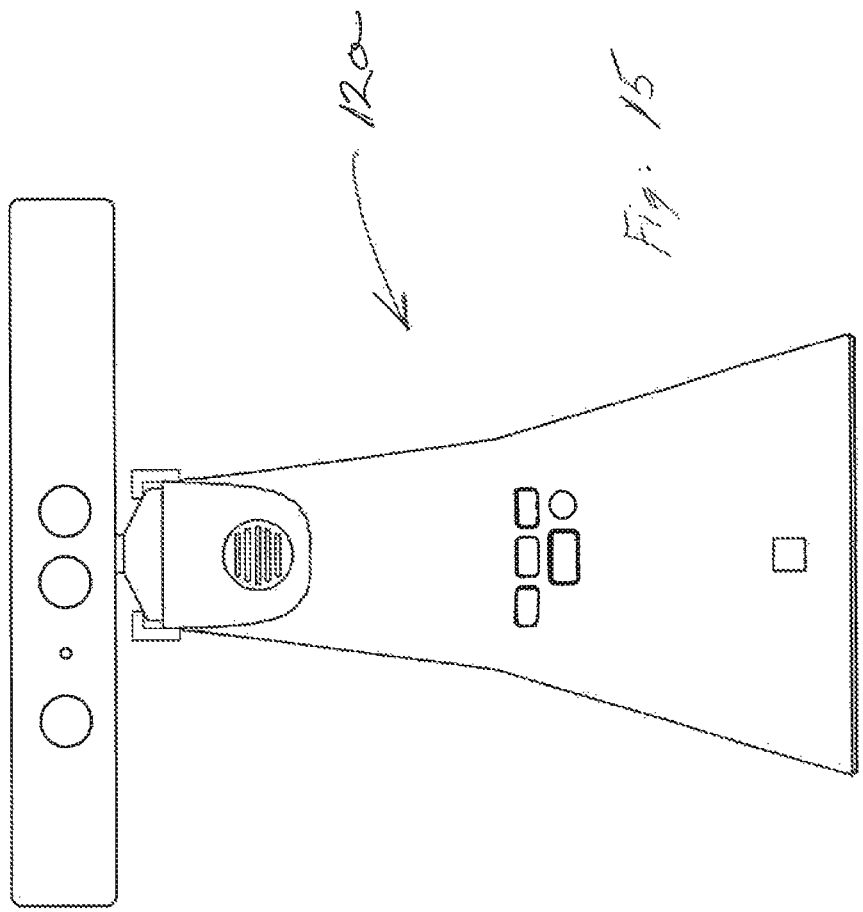
FIGS. 15 and 16 are a front view and side view of a modified head module for a Microsoft KINECT XBOX 360.
Figure 16:
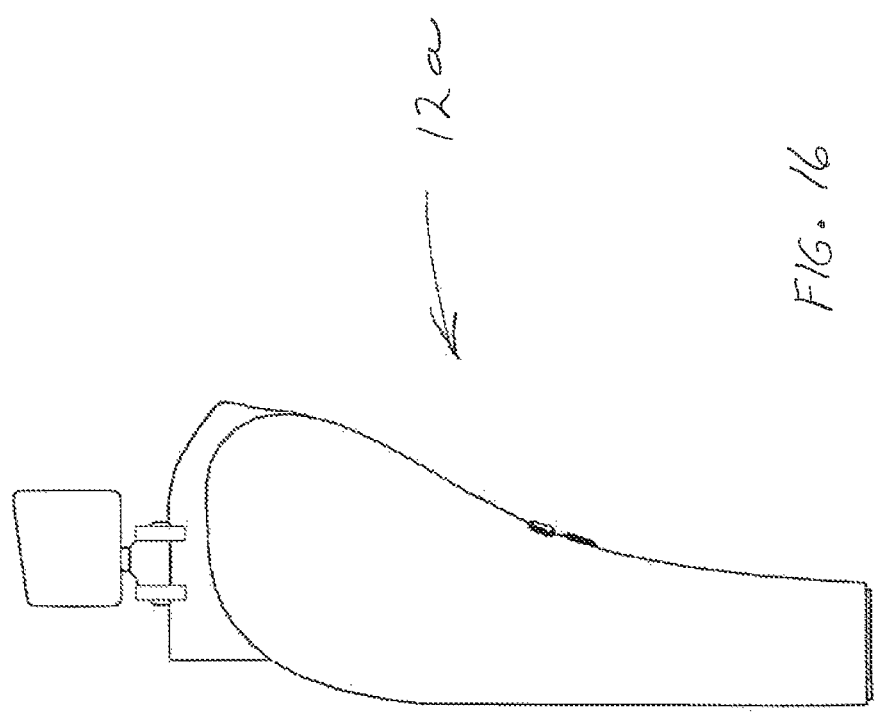

For further clarity of the head options, examine two examples in FIGS. 7 and 8 and the further head 12a of FIGS. 15 and 16. In FIG. 7, a third party tablet 10 can be seen sliding towards the left between the guide tabs of the tilting mounting plate 22 to mate with connectors in the head sub-assembly 12 which also includes a speaker, microphones, a tilting apparatus, and numerous status lights and button. In FIG. 8, an integrated head sub-assembly 72 containing a laser pointer apparatus 76, a large integrated display 74, as well as processing power, and wireless connectivity adds only one third party device—in this case, a Sony Playstation Eye™ camera and microphone array 70 mounted on a tilt mechanism. Both head sub-assemblies connect to the same mid-section, transition, and base sub-assemblies (the illustration in FIG. 8 is a smaller scale than that of FIG. 7).

FIGS. 7 and 8 however, target different markets. The head sub-assembly in FIG. 7 is fairly inexpensive, as the true cost and much of the functionality of the overall head is in the third party tablet device which offers the cost/performance benefits of truly massive production volumes. This device coupled with the head sub-assembly is likely to be used in an office or light commercial environment where the background noise is too high, in many cases, for the very small built-in speaker within the third party tablet—thus the inclusion of a more powerful speaker and microphone array in the head sub-assembly. This head also tilts, again useful for an office environment where looking down at a desk or machine is useful—as is looking up to a whiteboard during a meeting. No additional camera is necessary, as the tablet includes both forward and rear facing video cameras running at 30 frames per second which is good for slow movement, typified of motion in tight spaces. The more extensive light array is necessary since the base may be left either in its charging station or elsewhere with the tablet removed. In order to show battery level and whether or not charging is occurring when the tablet is removed, multiple lights are thus required. Further, an indicator light is used to show when the tablet has properly docked and if the 'do not disturb' function has been activated. Two buttons, one for the 'do-not-disturb' function and another for the 'sleep' function, are provided.

The head sub-assembly in FIG. 8 with the Playstation Eye™ can be used in a different environment. It has a larger touchscreen display, better for more distant viewing, yet doesn't include a speaker or tilt capability on the display (the weight of the larger display means that a forward tilt would significantly increase the chances of a forward fall in the event of an unexpected deceleration and thus tilt cannot be used with larger displays unless a counter-balanced head sub-assembly is used). When equipped with a Playstation Eye™ combining a high-speed video camera and microphone array on a tilting mount, this configuration makes an ideal virtual field trip presence robot or virtual shopping robot. For example, in the virtual field trip scenario, a guide walking through, say NASA or the Vatican, would carry a Playstation Move™ motion controller wand. The application would use sensor data from the high-speed Playstation Eye™ camera and Move™ controller to 'follow' the guide and look to the items that the guide gestures to throughout the tour. The high-speed camera enables the guide to move fairly quickly through the tour where necessary, as images taken from the moving virtual presence robot will not be too blurry. The array microphone reduces background noise, yet still conveys the ambiance while BLUETOOTH™ (or other wireless technology) headphones with integrated microphone enables the guide to hear and answer questions during the tour which can be autonomously sequenced by the online service connecting remote tourists to the tour.

At various points in the tour, the guide can ask visual questions which the entire group of virtual tourists can answer by clicking or touching objects seen on their screens—the laser pointer then projects point clouds on the actual objects or areas indicated by the tourists, with a dot representing each tourist's selection. Buttons on the Playstation Move™ could also be used to indicate the beginning of a question which would instruct the system to use voice recognition to place a textual version of the question on each tourist's screen along, with multiple choice or written answer replies which would be compiled in real time and communicated to the tour guide via the virtual presence robot's display or using computer generated speech, spoken to the guide over their wireless headphones. The guide could also hold up small written question and multiple choice answer cards which the virtual presence robot would recognize and immediately broadcast to each virtual tourist's screen for answer by touching the correct answer or in the case of a written answers response, an input box. Alternatively, verbal replies from the virtual tourists can also be processed through speech recognition techniques before being compiled and in this way, it would be possible for the tour guide to ask a verbal question to the tourists through either the array microphone or through a BLUETOOTH™ ear bud or headset microphone and then hear, or see displayed, the compiled results virtually immediately after asking the question.

An alternative to the Playstation Eye™ would be a Microsoft KINECT XBOX which can track hand, arm, and leg movements without the need for a wand, albeit through a slower camera. The Microsoft KINECT device itself incorporates a tilting camera mount, so the head sub-assembly 74 would be significantly less costly for the Microsoft KINECT than for the Playstation Eye™ as illustrated in FIGS. 15 and 16. In this configuration, targeted at security applications for Microsoft KINECT XBOX garners, beyond sight and sound (RGBD camera and microphone array in the Microsoft KINECT, and speaker in the head sub-assembly), the head sub-assembly as shown in FIGS. 15 and 16 has only a button/status light interface. In this extremely low-cost configuration, no processing other than the embedded circuit card in the base sub-assembly is available locally. Although the head sub-assembly could be augmented with a low-latency cellular data connection (ideally LIE or 4G speeds or faster) for Cloud computing services, typically, a WiFi connection from the embedded circuit card would link via a low-latency connection to remote processing as the robot cannot provide advanced navigation capabilities using solely the embedded circuit card. For security applications, a direct connection with cellular data is preferred.

As in the security application example above, in the) (BOX gamer scenario, the head sub-assembly is the same minimal configuration. However, the XBOX now becomes the remote processor—visitors of gainers log into the virtual presence robot and are able to move about in the room. The robot makes a WiFi connection to the XBOX (or vice-versa), where the visitor's face will be caused to appear (in a small window) on the TV screen. Thus, the gamer can continue the game while their visitor can watch and be entertained—through the robot, they can choose to face the TV screen or watch the gamer at the controls. Of course, head sub-assemblies offering richer local functionality incorporating the Microsoft KINECT are also likely, including those with dedicated LCD panels or combining a Microsoft KINECT with a tablet—but for a gamer on a tight budget, the head assembly with solely the Microsoft KINECT offers a unique way that friends who are not playing the game, can join in the fun.

Figure 9:
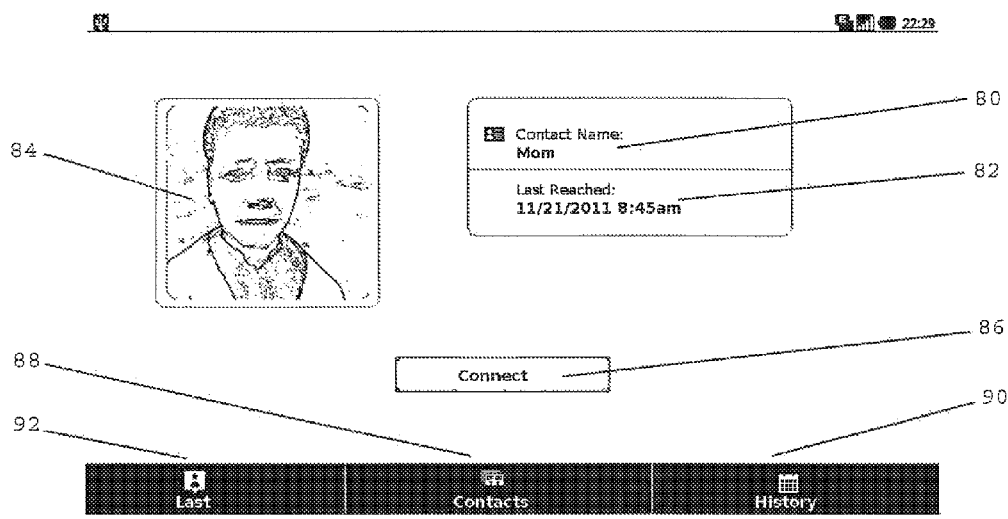
FIG. 9 illustrates a sample screen image from a remote host platform just before a connection to the virtual presence robot is established.

FIG. 9 illustrates a basic connection initiation screen from which a connection to a specific virtual presence robot is established based on either the owners name 80 or alternatively, the virtual presence robot's name. This application integrates with the video and audio capabilities of the remote host platform device including desktop, laptop, and other tablet computers as well as smartphones, web-enabled game consoles and televisions. Details of the connection to be established such as the visual clue 84, time of last successful connection 82 and access to the last connection 92, connection history 90 and a full contact list 88 is also provided.

Figure 10:
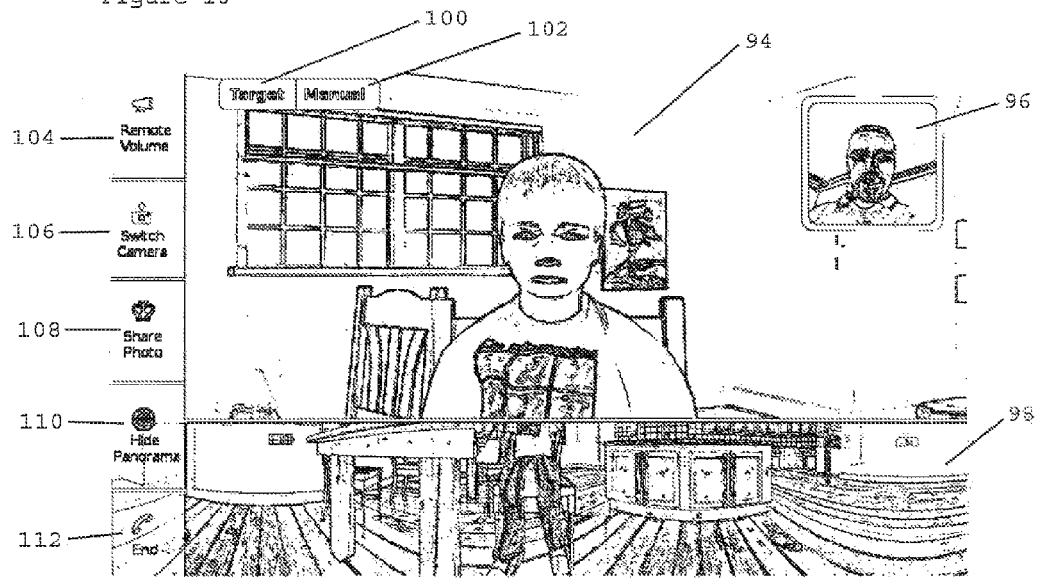
FIG. 10 illustrates a sample screen image from a remote host platform during connection with the virtual presence robot.

FIG. 10 illustrates an embodiment of some of the controls a remote connected user of the virtual presence robot is able to access from a smartphone or tablet. A similar experience is possible from any number of remote host platforms from Web-connected televisions (where arrow keys on the TV remote, or wireless pointer, would be used for button selection and navigation targeting) through desktop PC's (where the mouse would be used instead of touchscreen). The main view is the largest portion of the screen and is filled with the main camera real-time video view 94 broadcast from the virtual presence robot. Normally in 2D, if the virtual presence robot is equipped with a 3D main camera, and assuming the remote user has access to a 3D display or display/glasses combination or 3D goggles, this area will be received in 3D at a frame rate dynamically determined by the Internet connection speed. A sub-frame video 96 shows what the remote user is transmitting for display on the head screen of the virtual presence robot. A panorama 360 degree view of the immediate surroundings of the base of the virtual presence robot is shown in a wide window 98 (in either 2D or 3D, depending on the capabilities of the virtual presence robot and the user's equipment) so that in the event that manual navigation mode is selected by touching 102 and then interacting with a virtual joystick complete with spinhead, the remote user can see what might be blocking movement in a given direction. The video frame rate transmitted from the virtual presence robot for this panorama 98 is significantly less than in the main view unless the Internet channel is sufficient to support dual real-time streams. The panorama 98 can also be hidden 110 which reduces bandwidth demands. In the illustration of FIG. 10, the panorama 98 is shown as a continuous panorama which, as previously noted, must have some obstructed areas generated based on earlier frames. The connection may be terminated by touching the 'end' button 112.

For some host platforms, the virtual joystick is extended by swipe and other common touch screen gestures which are then transmitted to the virtual presence robot. For example, a double tap anywhere on the screen will cause that area of the image to immediately enlarge via image zooming while the virtual presence robot then turns to face and moves towards, and thus present a clarified view a few moments later.

In addition to the virtual onscreen joystick control in manual mode, interface capabilities of the remote host platform are integrated into the control system. For example, for the Apple iPhone and similarly equipped smartphones and tablets, a toggle option labeled 'virtual tracking' appears which, when enabled, links physical movement of the iPhone™ to be duplicated by the remote virtual presence robot where mechanically possible and without collisions or topples from stairs or windows. For example, if the user pushes the iPhone™ away from their body by extending their arms out straight or walks forward with the iPhone™, the virtual presence robot will move forward, in the direction of the iPhone™ motion. If the user then spins left or right, the virtual presence robot will rotate similarly. The screen on the iPhone™ will show the resulting motion which, depending on network lag and the speed of the motion, will lag behind the users motion. Quick shakes of the iPhone™ in one direction will move the virtual presence robot in that direction, as will tilts of the iPhone™—if equipped with a head tilt sub-assembly, the head will correspondingly tilt up or down to match the motion of the iPhone™. Similar experiences can be achieved with other remote host platforms.

Target navigation mode may be selected by touching 100, and in this mode, the user can then tap anywhere in either field of view 94 or 98 and the virtual presence robot will autonomously move and/or rotate to a physical location as close as possible and directly facing the selected target. A longer touch and then slide motion will drag out a rectangle over the field of view which will become a broader target location for the virtual presence robot. When in target mode if the "virtual tracking" toggle is enabled, during autonomous navigation to a selected point, the user can move and twist and turn the iPhone to adjust the path and any taps of the screen will change the target while the virtual presence robot is in motion. The robot always attempts to smooth motion so that resulting video streamed to the remote user will be as smooth as possible.

Other options available from the remote host platform include the ability to increase or decrease the remote speaker volume 104—handy when calling out to someone through the virtual presence robot. Where devices have both forward and rear cameras, they may be swapped 106 at both the remote host platform and on the virtual presence robot. Photos and videos that may be accessed from the remote host platform may also be shared 108 with the virtual presence robot and will be displayed on that robot's display, or where such robot has one or more registered affiliated display devices (typically web-connected TVs) redirected to one or more of such device while keeping the remote user's face on the virtual presence robot's screen. The virtual presence robot can also duplicate, at any time, its display content onto one or more registered affiliated display devices. This capability to include affiliated displays within the virtual communication session is very useful when sharing photos among friends and family, but is also highly desirable for distance learning whereby a guest lecturer or other educator can visit a remote classroom via the virtual presence robot and have their face on the screen of the robot while simultaneously sending a second stream of still images or video (including PowerPoint or other slides) which the virtual presence robot can re-direct to a number of affiliated display devices.

To fully exploit the virtual presence capabilities of the modular system, upgraded remote host platforms and different head units may be used. This is accommodated in the present modular design. For example, 3D goggles employing an accelerometer and gyro designed to enable the wearer to move their head to freely, and seamlessly change the view received from the virtual presence robot may be supported by upgrading the robot's head unit to capture, via two or more cameras, a far greater field of view than actually being viewed in the 3D goggles at any one moment. Although bandwidth intensive, by transmitting this broader 3D view, the remote host platform can reconstruct an immersive view which will exhibit no lag during physical head movements within a given envelope.

The virtual presence robot design anticipates advancements in each of the fields of 3D display technologies, high speed global data transmission, reductions in network latencies, and camera technologies. Today, a trade-off exists between the amount of visual data streamed from the virtual presence robot, network latency, and the range of seamless motion that the remote 3D goggles can support. A head unit which transmits a field of view 50% larger than displayed in the remote 3D goggles would enable such remote user to turn their head in any direction in a fairly deliberate, relatively slow manner and experience a seamless, smooth view as the virtual presence robot, with network delay, autonomously moves to keep streaming video centered ahead of the anticipated desired view.

The present design also supports special 3D virtual presence experiences. For example, by equipping the virtual presence robot head unit with an array of cameras and microphones capturing a full 360 degree, 3D, high resolution view and multi-directional sound, coupled with high-speed streaming data services, the virtual presence robot would enable any number of remote wearers of 3D goggles to stand or sit and rotate at any speed and in any direction as if they were truly at the spot where the robot was located. Although this would require that a considerable amount of data be transmitted, cable, satellite or fiber Internet providers, using multicast protocols, could cost-effectively transmit such streams in real time enabling hundreds of thousands of sports fans, for example, to all share the same front row seat.

Likewise, for educational purposes, students wearing 3D goggles sitting together in a classroom or lecture hall could look in any direction. Seating could be modified such that each student's chair is free to rotate 360 degrees without students colliding. Taking the virtual presence robot to venues such as dairy farms, maple sugar bushes, electrical generating stations, ship navigation decks, hospital operating rooms, submarines, building demolitions, and hundreds of other venues enables a new level of experience which would be impossible to physically execute with a class of students for safety or transportation logistics. Where real-time streaming is not possible due to network bandwidth limitations, the head device of the virtual presence robot could act as a recorder for later transmission.

Figure 17:
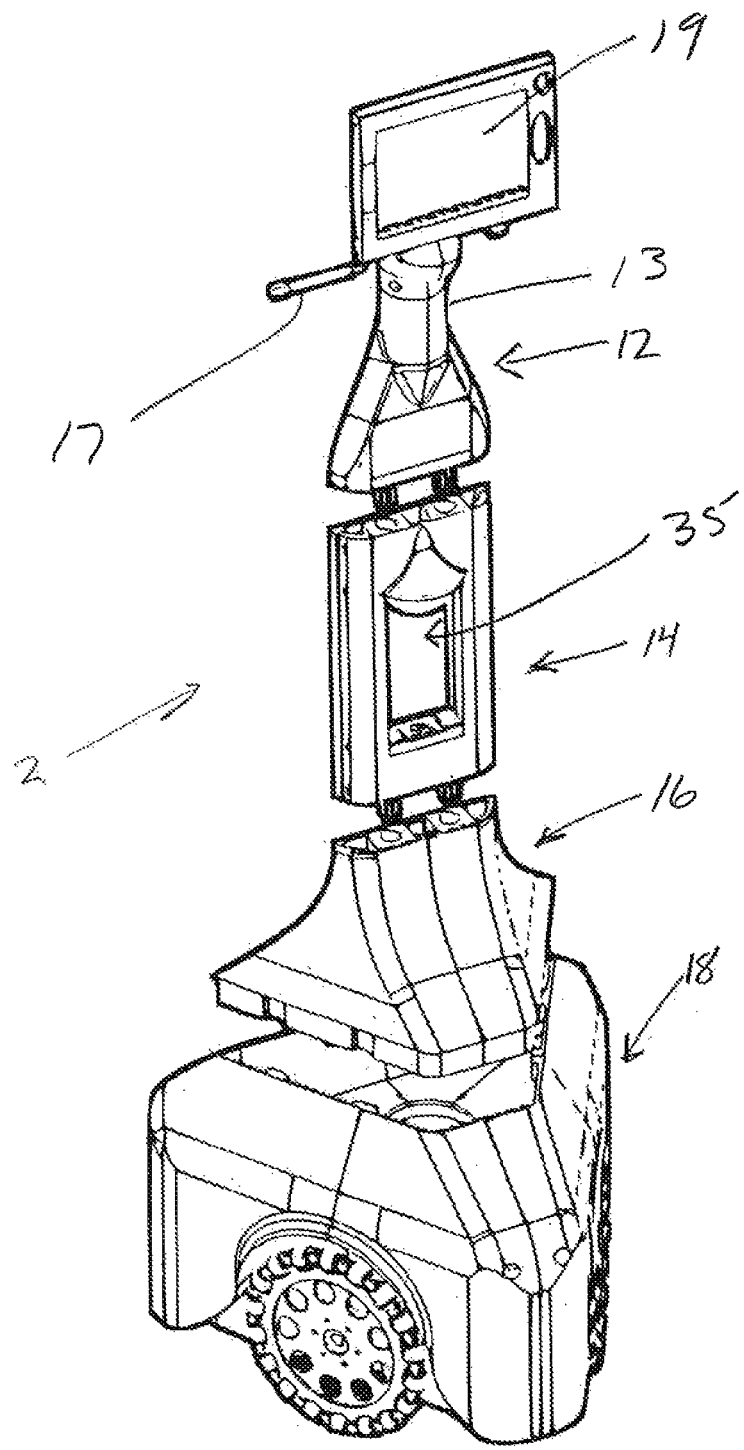
FIG. 17 is an exploded perspective view of a preferred robotic structure showing the interconnection between the various modules and a mechanical connection of a computer display to the head module.
Figure 18:
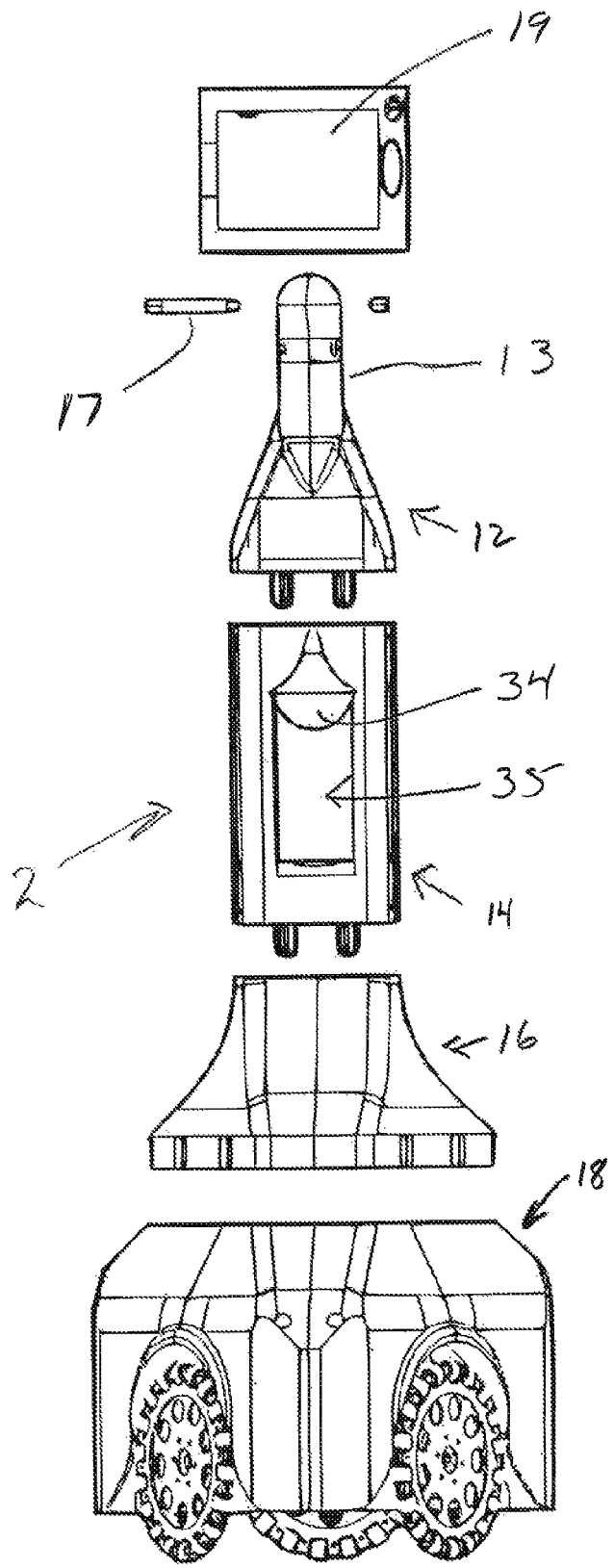
FIG. 18 is a front view of the perspective view of FIG. 17.
Figure 19:
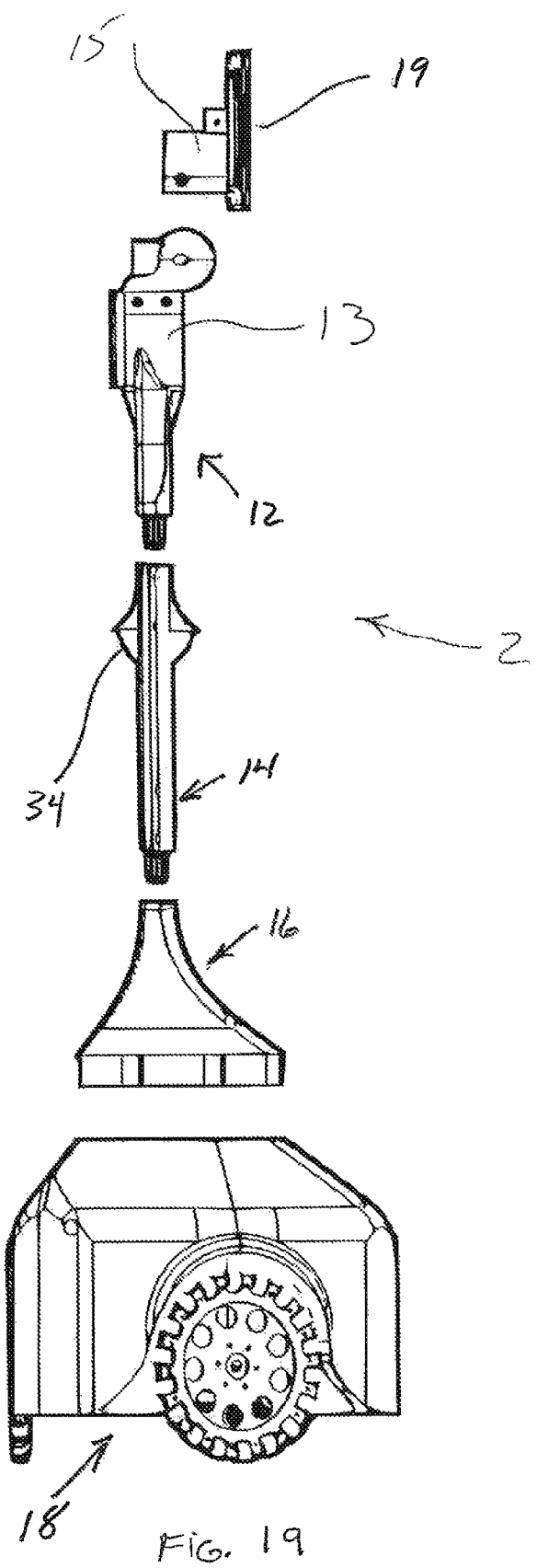
FIG. 19 is a side view of the device in FIG. 17.

Before describing the virtual presence robot 2 of FIGS. 17, 18 and 19 it is noted that the head module 12 thereof is shown as two pieces 13 and 15 having a pivot pin 17. Component 15 is shown with a connected computer tablet 19. The head module 12 is shown in this non-connected view to help illustrate a simple pivoting arrangement for mounting the computer tablet 19. In the preferred embodiment the head module is an assembled structure to the consumer who merely docks a third party tablet or other device to the head module 12. FIG. 7 shows the preferred slide mount of the third party device.

FIGS. 17, 18 and 19 illustrate the connections between the series of modules and the effective conversion from the generally triangular base module 18 and the triangular transition module 16 that then connects at an upper edge with a generally planar mid-section module 14 and the head module 12. The base module 18 and the transition module 16 include a series of vertical projecting members and appropriate locking slots provided at the lower edge of the transition module 16 to effectively secure the transition module to the base module. A series of pin connectors are shown to effectively connect the mid-section module 14 to the transition module 16 and similar pin connections connect the head module to the mid-section module. FIGS. 17, 18 and 19 also illustrate the positioning of the dome shaped reflector within the port 35 of the mid-section and the extent that the dome reflector extends front and back of the mid-section module 14.

The base module 18 is preferably of a width at least 2 times greater than the maximum width of the mid-section module 14.

The head attachment module is preferably of a width less than the width of the mid-section module. The transition segment tapers inwardly to form the transition from the triangular shape of the base module to the generally rectangular shape of the mid-section module. The mid-section module has front and back faces preferably at least 4 times the width of side faces thereof. The base module is typically of a weight at least five times the weight of modules supported thereabove.

Figure 20:
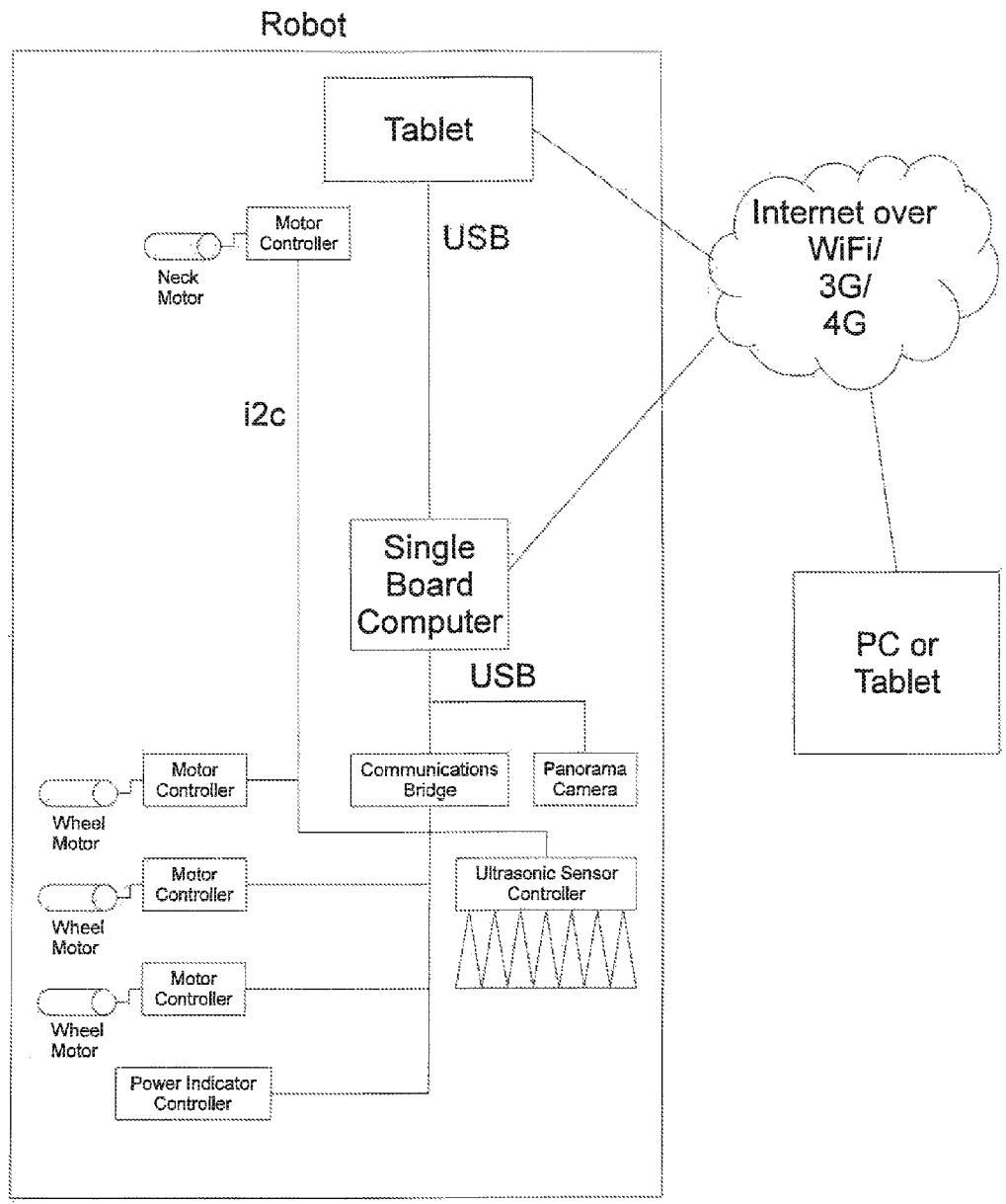
FIG. 20 is a general schematic showing the communication between the various devices.

FIG. 20 illustrates the communication paths between a remote PC or tablet via the Internet WiFi, 3G or 4G network to the robot. It also illustrates the communication within the robotic structure to the various motor drives, the various ultrasonic sensors, the panoramic camera and processing provided within the robot. Additional remote sensors and receivers are not shown but can be used via WiFi or Cellular data networks, as can the remote processing and service hub capabilities.

Figure 21:
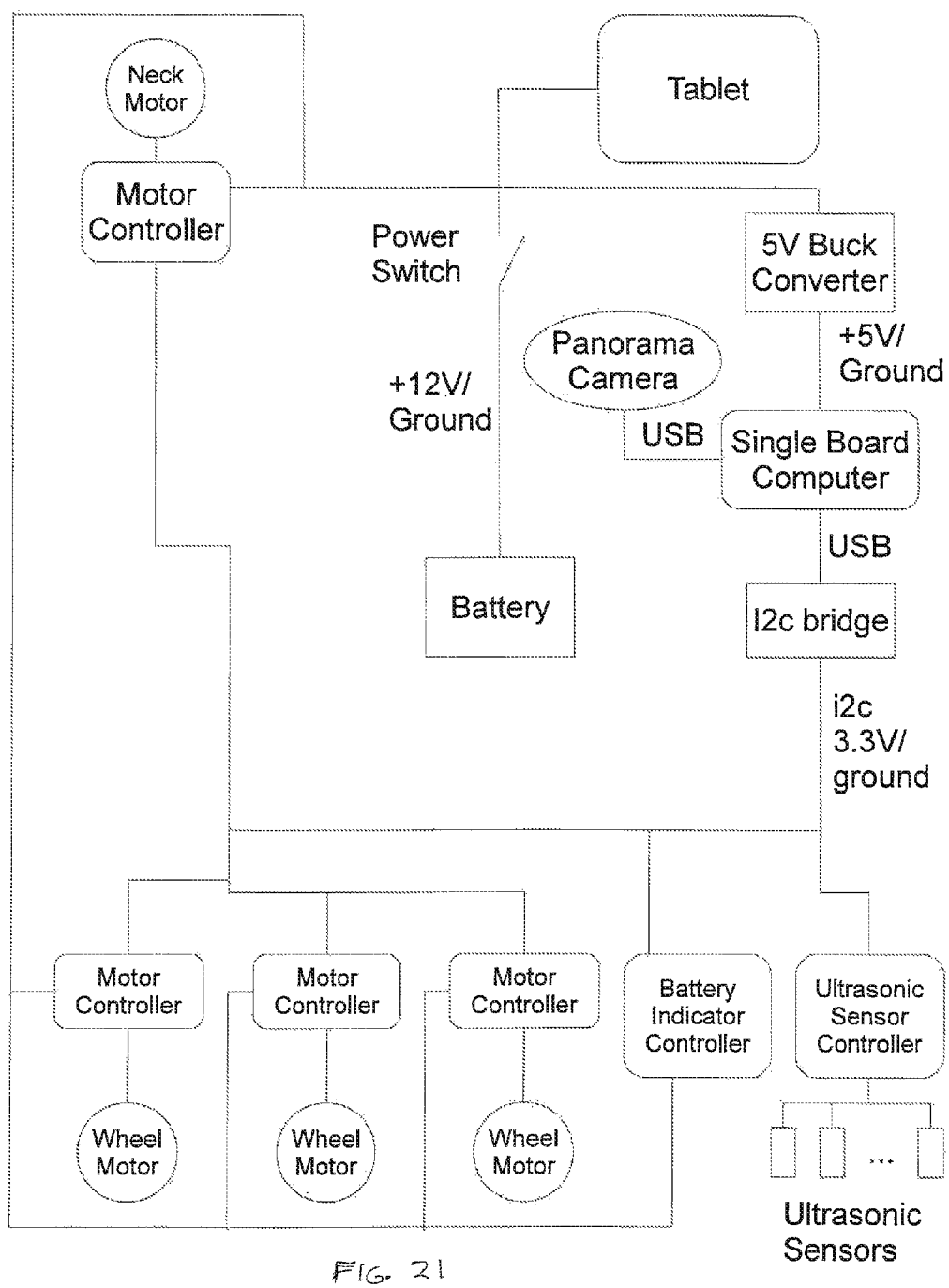
FIG. 21 is a schematic of the electrical connection of the various components.

FIG. 21 is an electrical schematic showing the connection of the various components within the robotic structure.

The present application describes a series of applications of the telepresence robot and includes applications where the communication between the robot and a person can be short range applications. One such application is with respect to providing retail assistance to potential customers initially by the robot with the capability to contact a store clerk if additional assistance is required by customer. In this particular example, the robot is contacting the sales clerk or further resource where the initiating individual's original communication is with the robot. This approach is also useful for other applications. For example, a person could contact a robot provided in their house using a cell phone to instruct the robot to undertake certain actions. These actions may be as simple as turning on lights within the house to other actions including activating automatic locks or being in a suitable position to confirm appropriate authorization through recognition of license plates, recognition of facial characteristics of the owner, etc.

It has been previously described that the robotic structure can also receive and transmit signals from remote equipment that may be distributed throughout a house or hospital. In this way there may be areas of premises that are not directly accessible by the robot however these remote stations can provide feedback or monitoring of these restricted areas. This may be particularly appropriate for seniors living on their own where a remote station is provided on the second floor of a house. In this way even though the robot may be confined to the first floor of the premises, the robot can provide assistance to an elderly person by monitoring the second floor space. In case of an emergency, the robot can determine an emergency condition and initiate appropriate communication to outside authorized personnel.

The various applications of the robot have included a number of sensors/communication links that provide knowledge and directly affect the functions of the robot. It is also possible that other links can provide information to the robot and are not in the form of a traditional sensor. Such additional information can come from outside communications (for example the Internet with respect to weather, television listings and other structured information, but also customized sources such as monitors for individuals, medical personnel etc. could all provide information that would affect the operation of the robot.

One of the features of the present design is the ability of the mobile platform to interface or cooperate with third party devices or systems and related online distribution infrastructure to be compatible with customized applications and to effectively utilize existing technology and leverage the automated distribution capability of related online application stores. Customized software can be developed with respect to these customized systems and devices to perform a host of diverse functions through standardized API's while maintaining compatibility with third party hardware and application stores and the general structure of the robotic platform.

The robotic structure as disclosed can provide effective monitoring and communication with actual events occurring at a remote location. Although this is a desirable function there are situations where such communication is not appropriate. It is recognized that there may be areas within a premises that are identified as being "non-transmit zones" and such zones can be automatically recognized by the robotic structure. It is also desirable to be able to manually set the robot in a "non-transmit mode" by a worker or authorized individual. This has particular application in hospital and medical care facilities and may also have applications in certain facilities where high security is required. The system is such that it can receive overriding or priority instructions that such a telecommunication function is temporarily interrupted. Such black out requests can be automatic or manually activated and can be temporary or specific to a certain area or specified time. As can be appreciated, any of these aspects can be programmed and/or recognized as such a condition to provide the interruption. The robotic design can also effectively transmit information indicating that the local "non-transmit" condition has been undertaken for a particular reason or will be experienced for a certain time period.

In many applications, there will be situations where privacy provisions over-ride the telecommunication function and as such the robotic structure is designed to either automatically or manually enter a non-transmit mode.

Although various preferred embodiments of the present invention have been described herein in detail, it will be appreciated by those skilled in the art, that variations may be made thereto without departing from the appended claims.

The embodiments of the invention in which an exclusive property or privilege is claimed are defined as follows:

1. A method of remotely controlling a telepresence robot comprising connecting the telepresence robot to the internet;
    using a camera of the telepresence robot to produce a first signal containing visual information with respect to a narrow field of view of a preferred facing direction of the telepresence robot;
    using a camera of the telepresence robot to produce a second signal containing visual information with respect to a broad field of view that includes both ground information in front of the telepresence robot and environmental information in at least a forward direction of the telepresence robot and information with respect to the narrow field of view;
    using the telepresence robot to transmit over the internet the first and second signals;
    receiving the first and second signals at a receiving device and displaying the first and second signals;
    selecting a portion of said displayed second signal on an input arrangement of said receiving device, determining information identifying the selected portion and sending to said telepresence robot said information identifying the selected portion;
    receiving at the telepresence robot the information identifying the selected portion and using the information to adjust the telepresence robot such that the facing direction of the telepresence robot is based on the selected portion.

2. A method as claimed in claim 1 wherein said telepresence robot uses the information identifying the selected portion to selectively activate motors used to drive omni-wheels of the telepresence robot to reposition the telepresence robot as required.

3. A method as claimed in claim 2 wherein the receiving device displays the second signal below the first signal and the receiving device is a touch screen device.

4. A method as claimed in claim 1 wherein said broad field of view is a panoramic view.

5. A method as claimed in claim 4 wherein said camera of said telepresence robot that produces said first signal is a forwardly facing camera and said camera of said telepresence robot that produces said second signal is directed upwardly to capture an image on an opposed dome mirror to produce said second signal.

6. A telepresence robot comprising a base with at least three omni-wheels with each omni-wheel having a separately controlled motor drive;
    a computer processing arrangement for receiving positional signals used to selectively activate each motor drive to reposition said telepresence robot in accordance with said positional signals;
    a first camera providing a digital signal of visual information in a limited field of view of the telepresence robot;
    a second camera providing a digital signal of visual information of a broad field of view of the telepresence robot that includes visual information of the limited field of view;
    a communication arrangement for transmitting signals of the limited field of view and said broad field of view to a remote receiver; and
    a receiving arrangement for receiving positional signals provided to said motor drives for repositioning of said telepresence robot.

7. A telepresence robot as claimed in claim 6 including ultrasonic sensors and an ultrasonic sensor controller providing additional information used to control the position of the telepresence robot using the separately controlled motor drives, and where each motor drive includes a motor controller for controlling movement of the particular omni-wheel.

* * * * *